US009990487B1

(12) United States Patent
Bailey et al.

(10) Patent No.: US 9,990,487 B1
(45) Date of Patent: Jun. 5, 2018

(54) SYSTEMS AND METHODS FOR DISTINGUISHING AMONG HUMAN USERS AND SOFTWARE ROBOTS

(71) Applicant: Mastercard Technologies Canada ULC, Vancouver (CA)

(72) Inventors: Christopher Everett Bailey, Langley (CA); Randy Lukashuk, Errington (CA); Jonathan Cunningham, Vancouver (CA)

(73) Assignee: Mastercard Technologies Canada ULC, Vancouver (CA)

( * ) Notice: Subject to any disclaimer, the term of this patent is extended or adjusted under 35 U.S.C. 154(b) by 0 days. days.

(21) Appl. No.: 15/588,189

(22) Filed: May 5, 2017

(51) Int. Cl.
| *G06F 7/04* | (2006.01) |
| *H04L 9/32* | (2006.01) |
| *G06F 21/00* | (2013.01) |
| *G06F 21/36* | (2013.01) |
| *H04L 29/06* | (2006.01) |
| *G06F 9/44* | (2018.01) |
| *G06T 1/20* | (2006.01) |

(52) U.S. Cl.
CPC .............. *G06F 21/36* (2013.01); *G06F 8/311* (2013.01); *G06T 1/20* (2013.01); *H04L 63/10* (2013.01); *G06F 2221/2133* (2013.01)

(58) Field of Classification Search
CPC .. G06F 21/36; G06F 8/311; G06F 2221/2133; H04L 63/10; G06T 1/20
USPC ..................... 726/4, 5, 7; 713/168, 182, 184
See application file for complete search history.

(56) References Cited

U.S. PATENT DOCUMENTS

| 5,774,525 A | 6/1998 | Kanevsky et al. |
| 5,940,080 A * | 8/1999 | Ruehle .................... G06T 15/50 345/611 |

(Continued)

FOREIGN PATENT DOCUMENTS

| CA | 2426168 A1 | 5/2002 |
| EP | 2854064 A1 | 4/2015 |

(Continued)

OTHER PUBLICATIONS

Extended European Search Report from European Patent Application EP 09727261.1 dated Mar. 7, 2012.

(Continued)

*Primary Examiner* — Aravind K Moorthy
(74) *Attorney, Agent, or Firm* — Wolf, Greenfield & Sacks, P.C.

(57) ABSTRACT

A technique for distinguishing between a human user and a software robot. The technique includes: receiving a first communication from a device different from the at least one computer; identifying, from the first communication, a request to access a web resource; generating an image that encodes a challenge text, the image comprising data stored in a plurality of channels including a transparency channel, the generating comprising: generating decoding information representing the challenge text; and storing the decoding information in the transparency channel of the image; transmitting, via the at least one network, the generated image to the device; receiving a second communication from the device; identifying, from the second communication, a response text; and providing the device with access to the web resource based on a comparison between the challenge text and the response text.

30 Claims, 19 Drawing Sheets

(56) References Cited

U.S. PATENT DOCUMENTS

| | | | |
|---|---|---|---|
| 5,940,751 | A | 8/1999 | Kaplan et al. |
| 6,829,711 | B1 | 12/2004 | Kwok et al. |
| 7,523,016 | B1 | 4/2009 | Surdulescu et al. |
| 7,680,891 | B1 | 3/2010 | Pongsajapan |
| 7,945,952 | B1 | 5/2011 | Behforooz |
| 8,001,597 | B2 | 8/2011 | Crooks |
| 8,082,349 | B1 | 12/2011 | Bhargava et al. |
| 8,117,458 | B2 | 2/2012 | Osborn, III et al. |
| 8,281,147 | B2 | 10/2012 | Florencio et al. |
| 8,386,393 | B2 | 2/2013 | Michelsen et al. |
| 8,397,275 | B1 | 3/2013 | Magdsick |
| 8,510,795 | B1 | 8/2013 | Gargi |
| 8,584,225 | B1 | 11/2013 | Kennedy et al. |
| 8,621,578 | B1 | 12/2013 | Blomquist et al. |
| 8,732,477 | B2 | 5/2014 | Osborn et al. |
| 8,887,286 | B2 | 11/2014 | Dupont et al. |
| 8,898,766 | B2 | 11/2014 | Garmark et al. |
| 9,203,833 | B2 | 12/2015 | Foreman |
| 9,253,131 | B2 | 2/2016 | Blair |
| 9,256,715 | B2 | 2/2016 | Draluk et al. |
| 9,275,215 | B2 | 3/2016 | Bailey |
| 9,378,354 | B2 | 6/2016 | Bailey |
| 9,485,118 | B1 | 11/2016 | Atlas et al. |
| 9,633,190 | B2 | 4/2017 | Bailey |
| 9,648,034 | B2 | 5/2017 | Bailey et al. |
| 2002/0090926 | A1 | 7/2002 | Pirkola et al. |
| 2003/0101357 | A1 | 5/2003 | Ronen et al. |
| 2004/0054924 | A1 | 3/2004 | Chuah et al. |
| 2004/0230843 | A1 | 11/2004 | Jansen |
| 2004/0254793 | A1 | 12/2004 | Herley et al. |
| 2005/0097320 | A1 | 5/2005 | Golan et al. |
| 2005/0114705 | A1 | 5/2005 | Reshef et al. |
| 2005/0144067 | A1 | 6/2005 | Farahat et al. |
| 2005/0209974 | A1 | 9/2005 | Okunseinde |
| 2006/0206941 | A1 | 9/2006 | Collins |
| 2006/0212931 | A1 | 9/2006 | Shull et al. |
| 2006/0230039 | A1 | 10/2006 | Shull et al. |
| 2006/0282660 | A1 | 12/2006 | Varghese et al. |
| 2007/0043681 | A1 | 2/2007 | Morgan et al. |
| 2007/0124201 | A1 | 5/2007 | Hu et al. |
| 2007/0124806 | A1 | 5/2007 | Shulman et al. |
| 2007/0140131 | A1 | 6/2007 | Malloy et al. |
| 2007/0226053 | A1 | 9/2007 | Carl et al. |
| 2007/0277224 | A1 | 11/2007 | Osborn et al. |
| 2008/0040285 | A1 | 2/2008 | Wakmueller |
| 2008/0050018 | A1 | 2/2008 | Koziol |
| 2008/0114885 | A1 | 5/2008 | Kulkarni et al. |
| 2008/0127302 | A1 | 5/2008 | Qvarfordt et al. |
| 2008/0133321 | A1 | 6/2008 | Pennock |
| 2008/0133347 | A1 | 6/2008 | Josifovski et al. |
| 2008/0133348 | A1 | 6/2008 | Reed et al. |
| 2008/0162338 | A1 | 7/2008 | Samuels et al. |
| 2008/0189768 | A1 | 8/2008 | Callahan et al. |
| 2008/0250497 | A1 | 10/2008 | Mullarkey et al. |
| 2008/0250505 | A1 | 10/2008 | Koziol |
| 2008/0301040 | A1 | 12/2008 | Knudson et al. |
| 2009/0012855 | A1 | 1/2009 | Jamal et al. |
| 2009/0019182 | A1 | 1/2009 | Riise et al. |
| 2009/0077629 | A1 | 3/2009 | Douceur et al. |
| 2009/0113294 | A1 | 4/2009 | Sanghavi et al. |
| 2009/0138723 | A1 | 5/2009 | Nyang et al. |
| 2009/0249477 | A1 | 10/2009 | Punera |
| 2009/0328163 | A1 | 12/2009 | Preece |
| 2010/0031315 | A1 | 2/2010 | Feng et al. |
| 2010/0077209 | A1 | 3/2010 | Broder et al. |
| 2010/0077482 | A1 | 3/2010 | Adams |
| 2010/0082771 | A1* | 4/2010 | Wood ............... G06F 15/16 709/219 |
| 2011/0016052 | A1 | 1/2011 | Scragg |
| 2011/0016534 | A1 | 1/2011 | Jakobsson et al. |
| 2011/0029902 | A1 | 2/2011 | Bailey |
| 2011/0047605 | A1 | 2/2011 | Sontag et al. |
| 2011/0202982 | A1 | 8/2011 | Alexander et al. |
| 2011/0247071 | A1 | 10/2011 | Hooks et al. |
| 2012/0096557 | A1 | 4/2012 | Britton et al. |
| 2012/0167204 | A1 | 6/2012 | Akka |
| 2012/0207046 | A1 | 8/2012 | DiPietro et al. |
| 2012/0210429 | A1 | 8/2012 | Stute |
| 2012/0266215 | A1 | 10/2012 | Frank |
| 2012/0272302 | A1 | 10/2012 | Zhu et al. |
| 2012/0310838 | A1 | 12/2012 | Harris et al. |
| 2012/0323700 | A1 | 12/2012 | Aeksandrovich et al. |
| 2013/0024339 | A1 | 1/2013 | Chourdhuri et al. |
| 2013/0104217 | A1 | 4/2013 | Kruger et al. |
| 2013/0111579 | A1* | 5/2013 | Newman ............... G06F 3/0488 726/17 |
| 2013/0205370 | A1 | 8/2013 | Kalgi et al. |
| 2013/0239206 | A1 | 9/2013 | Draluk et al. |
| 2013/0276125 | A1 | 10/2013 | Bailey |
| 2013/0339186 | A1 | 12/2013 | French et al. |
| 2014/0109002 | A1* | 4/2014 | Kimball ............... G06F 3/04842 715/800 |
| 2014/0185920 | A1* | 7/2014 | Kelley ............... G06T 11/60 382/154 |
| 2014/0229414 | A1 | 8/2014 | Goldberg et al. |
| 2014/0250538 | A1 | 9/2014 | Rapaport et al. |
| 2014/0317750 | A1 | 10/2014 | Bailey |
| 2014/0317751 | A1 | 10/2014 | Bailey |
| 2014/0325657 | A1 | 10/2014 | Bailey |
| 2014/0380448 | A1 | 12/2014 | Bailey |
| 2015/0033086 | A1 | 1/2015 | Sasturkar et al. |
| 2015/0106888 | A1 | 4/2015 | Cheng et al. |
| 2016/0055329 | A1 | 2/2016 | Akula et al. |
| 2016/0078644 | A1* | 3/2016 | Yue ............... G06K 15/1878 382/199 |
| 2016/0180557 | A1 | 6/2016 | Yousaf et al. |
| 2016/0359872 | A1 | 12/2016 | Yadav et al. |
| 2017/0061115 | A1 | 3/2017 | Kalra |
| 2017/0070517 | A1 | 3/2017 | Bailey et al. |
| 2017/0070521 | A1 | 3/2017 | Bailey et al. |
| 2017/0070522 | A1 | 3/2017 | Bailey et al. |
| 2017/0070523 | A1 | 3/2017 | Bailey et al. |
| 2017/0070524 | A1 | 3/2017 | Bailey et al. |
| 2017/0070525 | A1 | 3/2017 | Bailey et al. |
| 2017/0070526 | A1 | 3/2017 | Bailey et al. |
| 2017/0070527 | A1 | 3/2017 | Bailey et al. |
| 2017/0070533 | A1 | 3/2017 | Bailey et al. |
| 2017/0070534 | A1 | 3/2017 | Bailey et al. |
| 2017/0103395 | A1 | 4/2017 | Everhart |
| 2017/0116702 | A1* | 4/2017 | Viggers ............... G06T 1/20 |
| 2017/0134414 | A1 | 5/2017 | Bailey et al. |
| 2017/0180384 | A1* | 6/2017 | Malenfant ............... H04L 63/12 |

FOREIGN PATENT DOCUMENTS

| | | | |
|---|---|---|---|
| EP | 2892198 A1 | 7/2015 | |
| JP | 2008/052727 A | 3/2008 | |
| WO | WO 2001/080525 A1 | 10/2001 | |
| WO | WO 2005/119648 A2 | 12/2005 | |
| WO | WO 2007/136665 A2 | 11/2007 | |
| WO | WO 2008/025019 A1 | 2/2008 | |
| WO | WO 2008/027642 A2 | 3/2008 | |
| WO | WO 2009/122302 A2 | 10/2009 | |

OTHER PUBLICATIONS

Extended European Search Report from European Patent Application EP 14765198.8 dated Sep. 13, 2016.
Invitation to Pay Additional Fees for International Application No. PCT/IB2009/005645 dated Sep. 2, 2009.
International Search Report and Written Opinion for International Application No. PCT/IB2009/005645 dated Nov. 20, 2009.
International Preliminary Report on Patentability for International Application No. PCT/IB2009/005645 dated Oct. 14, 2010.
International Search Report and Written Opinion for International Application No. PCT/CA2014/050229 dated Jun. 17, 2014.
International Preliminary Report on Patentability for International Application No. PCT/CA2014/050229 dated Sep. 24, 2015.
Adverlab Blog Spot, "CAPTCHA Advertising, Part II," Jan. 8, 2007. http://adverlab.blospot.com/2007/01/captcha-advertising-part-ii.html, retrieved on Jul. 24, 2008.

(56) References Cited

OTHER PUBLICATIONS

Adverlab Blog Spot, "Captcha Advertising," Oct. 27, 2005. http://www.adverlab.blogspot.com/2005/10/captcha-advertising.html, retrieved on Jul. 24, 2008.
Athanasopoulos et al. "Enhanced CAPTCHAs: Using Animation to Tell Humans and Computers Apart," H. Leitol and E. Markatos (Eds): CMS 2006, LNCS 4237, pp. 97-108, 2006. IFIP international Federation for Information Processing 2006.
Chemane et al., MCDM model for selecting Internet access technologies—A case study in Mozambique. Proceedings of the International Conference on Computer as a Tool. EUROCON 2005, Belgrade, Serbia & Montenegro, Nov. 22-24, 2005. pp. 1738-1741, Nov. 22, 2005.
Delfigo Corporation. "DSGateway: Context-Based Identity Assurance," Copyright 2009. http://www.delfigosecurity.com/products, retrieved on Mar. 11, 2009.
Fischer, I. et al. "Visual CAPTCHAs for Document Authentication," 2006 IEEE 8th Workshop on Multimeida Signal Processing, MMSP '06. Victoria, Canada, Oct. 1, 2006, pp. 471-474.
Giasson, "Expand your ad network with an interactive video ad unit that generates unprecedented user engagement—and protects websites and services from hackers." Leap Marketing NuCaptcha Concept Videos. Leap Marketing Technologies. Available at http://microsoft.leapmaketing.com/. Last accessed Feb. 23, 2009. 3 pages.
Godin, S., Seth's Blog, "Commercializing Captcha," Dec. 1, 2006. http://sethgodin.typepad.com/seths_blog/2006/12/commercializing.html, retrived on May 17, 2012.
JY's Weblog, "Ads in Captchas," May 1, 2007. http://jy.typepad.com/jy/2007/01/ads_in_captchas.html.
Kearns, D., "Start-up Measures Users' Trustworthiness for Authentication into Sites," Network World, Jan. 21, 2009. http://www.networkworld.com/newsletters/dir/2009/011909id2.html, retrieved on Mar. 11, 2009.
Liao, W.-H., et al. "Embedding Information within Dynamic Visual Patterns," 2004 IEEE International Conference on Multimedia and Expo: Jun. 27-30, 2004, Taipei, Taiwan, IEEE Operations Center, Piscataway, NJ, vol. 2, Jun. 27, 2004, pp. 895-898.
Naone, E., Technology Review, "The Captcha Arms Race," Mar./Apr. 2009.
Schultz, "Reputation scoring changes the enterprise security game." ComputerWorld. Apr. 3, 2009. 3 pages.
Teleport Jobs Webmaster Tools, "Free CAPTCHA," Copyright 2004-2007. http://www.teleportjobs.com/captcha.asp, retrieved on Jul. 24, 2008.
U.S. Appl. No. 12/935,927, filed Oct. 1, 2010, Bailey.
U.S. Appl. No. 15/526,607, filed Sep. 4, 2016, Bailey et al.
Chew et al., Image Recognition CAPTCHAs. UC Berkeley Computer Science Division. 2004. 19 pages.
Da Silva et al., A Hybrid Method for Image Taxonomy: Using CAPTCHA for Collaborative Knowledge Acquisition. American association for Artificial Intelligence. 2006. 7 pages.
Da Silva et al., KA-CAPTCHA: An Opportunity for Knowledge Acquistion on the Web. Association for the Advancement of Artificial Intelligence. 2007. 1322-7.
Daher, Posh: A Generalized CAPTCHA With Security Applications. Massachusetts Institute of Technology. Jun. 2008. 53 Pages.
Datta et al., Imagination: a robust image-based CAPTCHA generation system. ResearchGate. Jan. 2005. 5 pages.
Dhamija et al., Déjà Vu: A User Study Using Images for Authentication*. SIMS/CS, University of California Berkely. 14 pages.
Elson et al., Asirra: A CAPTCHA that Exploits Interest-Aligned Manual Image Categorization. Microsoft. 9 pages.
Fusco et al, "NET-Fli: On-the-fly Compression, Archiving and Indexing of Streaming Network Traffic". Proceedings of the Proceedings of the Very Large Database(VLDB) Endowment. 2010;3(1-2):1382-93.
Kompella et al., On Scalable Attack Detection in the Network. IEEE/ACM Transactions on Networking. 2007;15(1):14-25.
Lopresti, Leveraging the CAPTCHA Problem. Computer Science and Engineering. Lehigh University. 2005. 15 pages.
Misra et al., Face Recognition CAPTCHAs. Dept. of ECE, George Mason University, USA. 6 pages.
Sheheryar et al., A Review on CAPTCHA Generation and Evaluation Techniques. ARPN Journal of Engineering and Applied Sciences. 2016;11(9):5800-11.
Von Ahn et al., Labeling Images with a Computer Game. School of Computer Science. Carnegie Mellon University. 2004. 8 pages.
Von Ahn et al., reCAPTCHA: Human-Based Character Recognition via Web Security Measures. Science. 2008;321:5 pages.
Von Ahn, Human Computation. School of Computer Science. Carnegie Mellon University. Dec. 7, 2005. 87 pages.
Yang et al., A Comprehensive Human Computation Framework—with Application to Image Labeling. ACM. 2008. 479-88.
Yen et al., "Traffic Aggregation for Malware Detection." Proceedings of the 5th International Conference on Detection of Intrusions and Malware, and Vulnerability Assessment. DIMVA. 2008:207-27.
U.S. Appl. No. 12/935,937, filed Oct. 1, 2010 Bailey.
U.S. Appl. No. 14/218,824, filed Mar. 18, 2014, Bailey.
U.S. Appl. No. 14/218,839, filed Mar. 18, 2014, Bailey.
U.S. Appl. No. 14/481,698, filed Sep. 9, 2014, Bailey.
U.S. Appl. No. 13/834,733, filed Mar. 15, 2013, Bailey.
U.S. Appl. No. 14/218,806, filed Mar. 18, 2014, Bailey.
U.S. Appl. No. 15/256,607, filed Sep. 4, 2016, Bailey et al.
U.S. Appl. No. 15/256,610, filed Sep. 4, 2016, Bailey et al.
U.S. Appl. No. 15/256,611, filed Sep. 4, 2016, Bailey et al.
U.S. Appl. No. 15/256,597, filed Sep. 4, 2016, Bailey et al.
U.S. Appl. No. 15/256,600, filed Sep. 4, 2016, Bailey et al.
U.S. Appl. No. 15/256,603, filed Sep. 4, 2016, Bailey et al.
U.S. Appl. No. 15/411,805, filed Jan. 20, 2017, Bailey et al.
U.S. Appl. No. 15/256,612, filed Sep. 4, 2016, Bailey et al.
U.S. Appl. No. 15/256,613, filed Sep. 4, 2016, Bailey et al.
U.S. Appl. No. 15/256,616, filed Sep. 4, 2016, Bailey et al.
U.S. Appl. No. 15/256,617, filed Sep. 4, 2016, Bailey et al.
U.S. Appl. No. 15/617,542, filed Jun. 8, 2017, Bailey et al.
U.S. Appl. No. 15/588,124, filed May 5, 2017, Bailey et al.
U.S. Appl. No. 15/588,244, filed May 5, 2017, Bailey et al.
EP 09727261.1, dated Mar. 7, 2012, Extended European Search Report.
EP 14765198.8, dated Sep. 13, 2016, Extended European Search Report.
PCT/CA2014/050229, dated Jun. 17, 2014, International Search Report and Written Opinion.
PCT/CA2014/050229, dated Sep. 24, 2015, International Preliminary Report on Patentability.
PCT/IB2009/005645, dated Sep. 2, 2009, Invitation to Pay Additional Fees.
PCT/IB2009/005645, dated Nov. 20, 2009, International Search Report and Written Opinion.
PCT/IB2009/005645, dated Oct. 14, 2010, International Preliminary Report on Patentability.
International Search Report and Written Opinion for International Application No. PCT/IB2017/000640 dated Feb. 5, 2018.

* cited by examiner

FIG. 4A

| 1 | 2 | 3 | 4 | 5 |
|---|---|---|---|---|
| 6 | 7 | 8 | 9 | 10 |

FIG. 4B

| 9 | 4 | 8 | 2 | 1 |
|---|---|---|---|---|
| 7 | 3 | 5 | 10 | 6 |

FIG. 4C

| 1 | 2 | 3 | 4 | 5 | 6 | 7 | 8 | 9 | 10 |
|---|---|---|---|---|---|---|---|---|----|
| 9 | 4 | 8 | 2 | 1 | 7 | 3 | 5 | 10 | 6 |

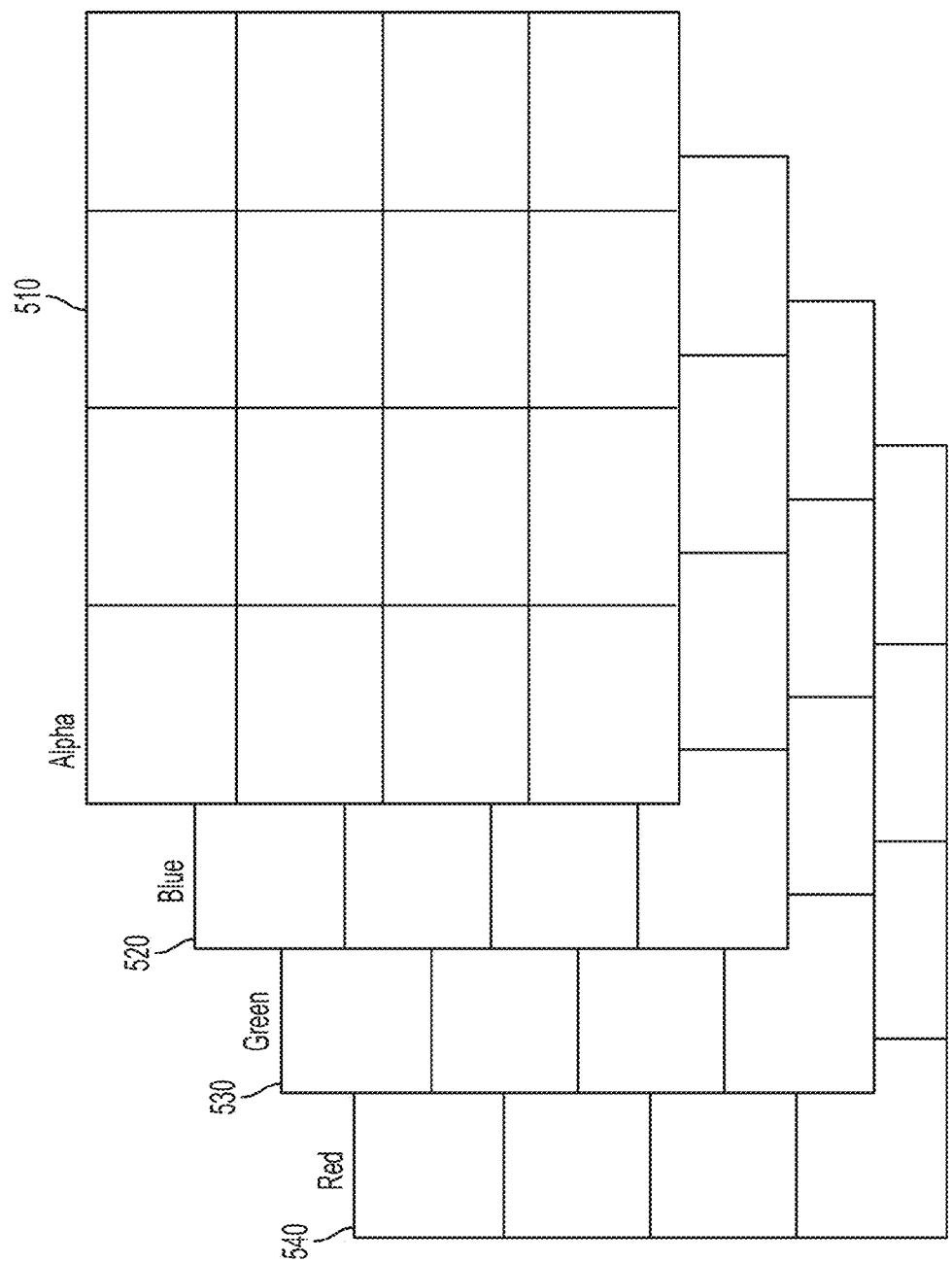

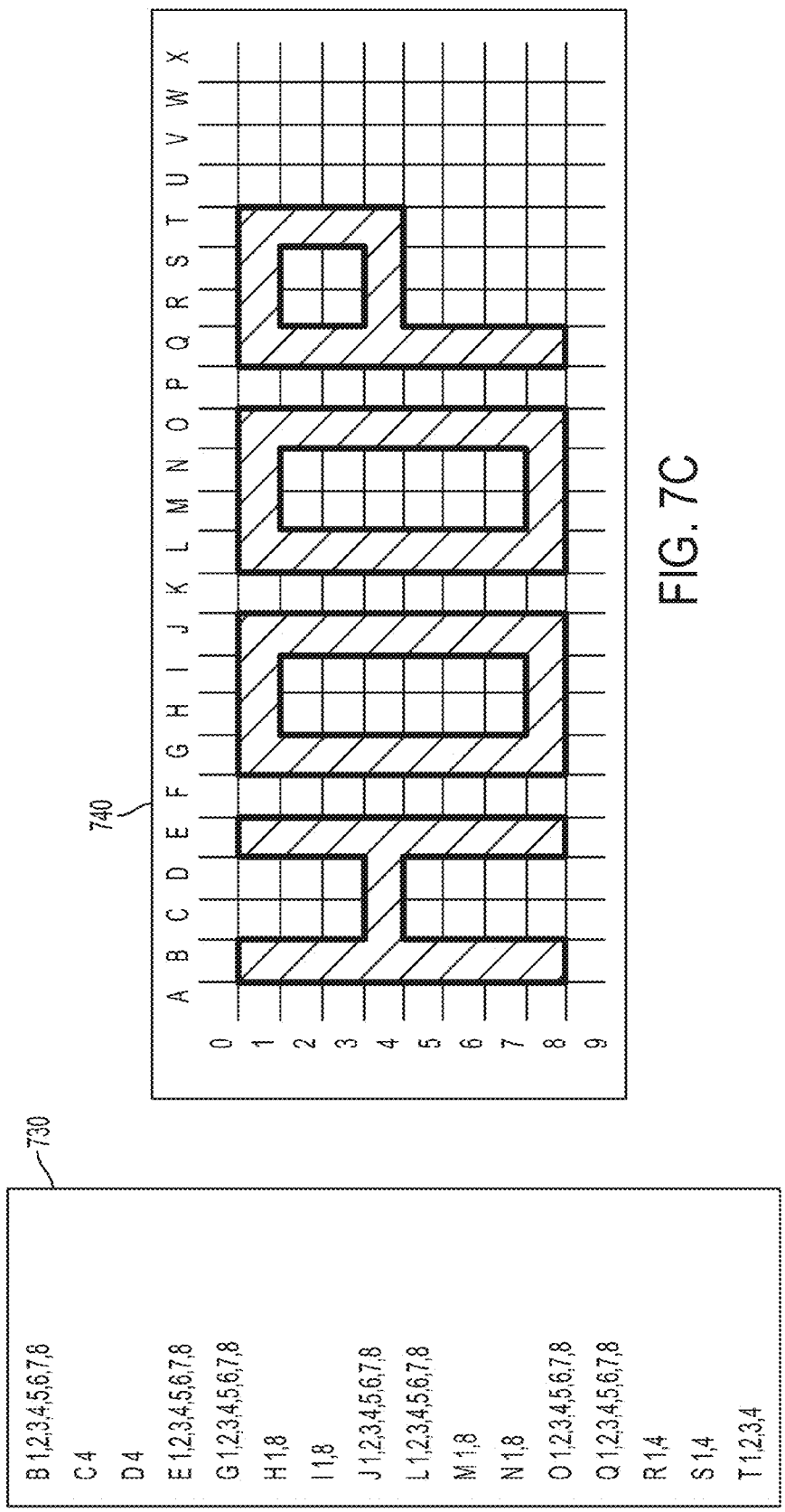

```
<html>
<form>
    <!-- Location in the form where the CAPTCHA challenge is displayed. -->
    <canvas title="NuCaptcha Challenge" id="nucaptcha-challenge"    ~830
        width="240" height="60">
    </canvas>

<!-- The captcha rendering is initialized with javascript.
         The captchaData object contains all of the encoded metadata to display.
         The CAPTCHA such as pixel templates and x,y coordinates to place each pixel template. -->
    <script type="text/javascript">
        var captchaData = [[0,7,21], [52,75,4], ...];    ~810
        nds.initStyledNuCaptcha(captchaData);    ~820
    </script>
</form>
</html>
```

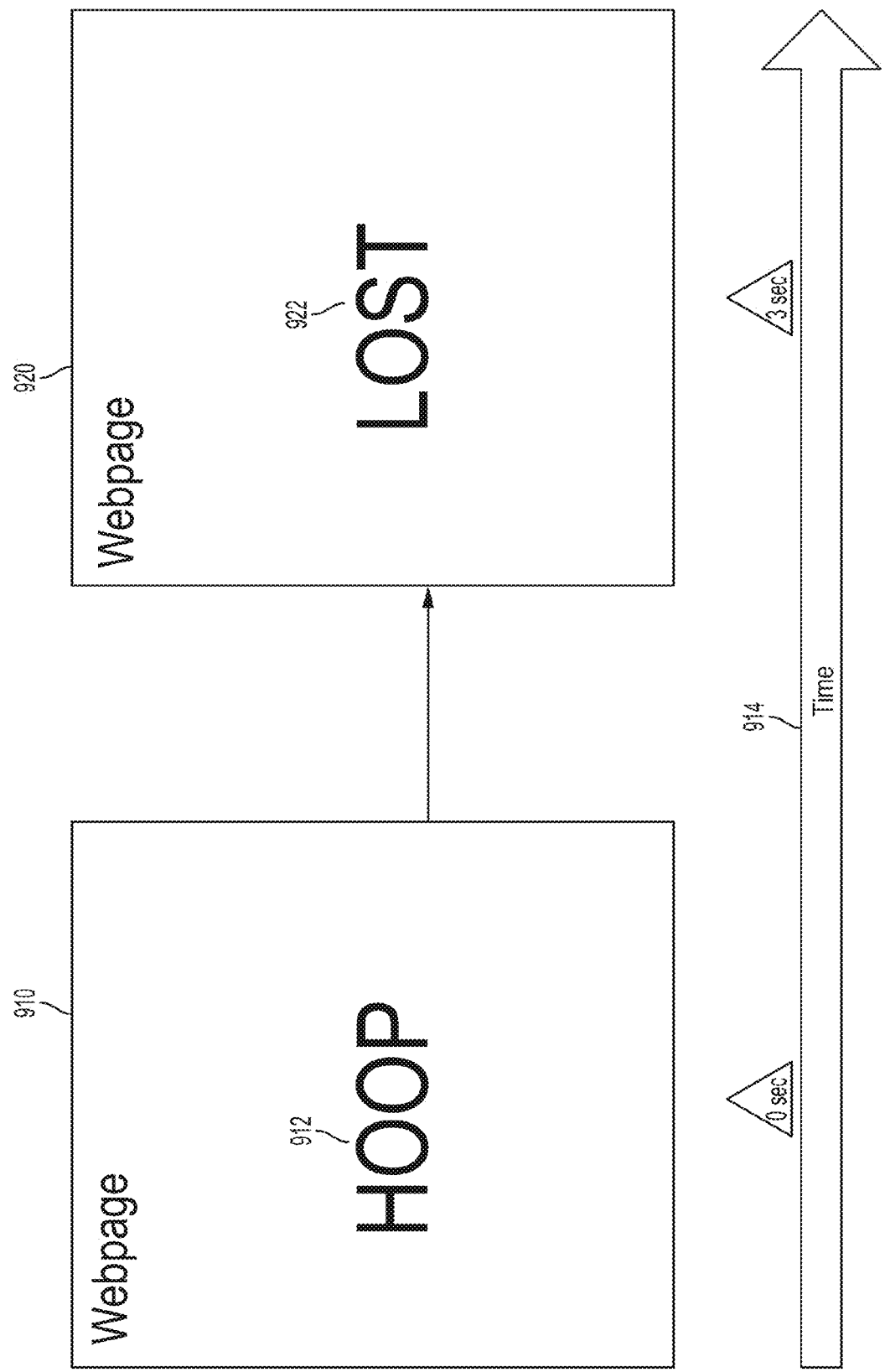

SYSTEMS AND METHODS FOR DISTINGUISHING AMONG HUMAN USERS AND SOFTWARE ROBOTS

BACKGROUND

An entity in control of an online resource may wish to allow human users to access the web resource, while simultaneously limiting or restricting access to the web resource by software robots (or "bots") programmed to simulate human users. For example, a website publisher (e.g., publisher of an e-commerce or a financial institution portal) may wish to restrict bots from accessing webpages of the website and/or performing transactions via the website. The ability to restrict access by bots, while continuing to provide access to humans, is desirable in settings where bots pose a security threat. For example, an operator of a financial institution or e-commerce portal may wish to prevent bots from creating numerous new accounts and using the new accounts for illicit or nefarious purposes such as phishing, spoofing, and/or spamming. As another example, a website operator may wish to prevent bots from accessing webpages so that the website is not flooded with bot traffic, which may prevent human users from accessing the website, as the case may be during a denial of service attack.

One conventional approach for distinguishing between human users and bots relies on a challenge called a "CAPTCHA", which is an acronym that stands for a "Completely Automated Public Turing Test to Tell Computers and Humans Apart." In a conventional CAPTCHA challenge, an image representing a distorted text string is sent to a user's device (e.g., as a GIF, JPG, or PNG file part of a webpage), the user's device displays the image for the user to see, and the user enters and submits a text string that the user believes is represented by the image (e.g., using a text field in the webpage). When the text string entered by the user matches the text string represented by the image, the user is deemed to be a human user and is allowed to access a web resource (e.g., to access a webpage, perform a transaction, post in a discussion forum, etc.).

SUMMARY

The inventors have recognized and appreciated that, with recent improvements in optical character recognition technology, a malicious entity may solve a conventional CAPTCHA challenge quickly and with high probability of success by using a software bot to download an image representing a distorted text string and applying an OCR technique to the image. To address this threat, the inventors have developed new types of CAPTCHA challenges, which are significantly more secure against attacks by software bots than conventional CAPTCHA challenges. These new types of CAPTCHA challenges require a significantly greater amount of computational resources to be used by malicious entities to solve even a single CAPTCHA challenge, and as a result provide a significant barrier to malicious entities wishing to carry out a high volume of attacks.

Some embodiments are directed to a system comprising: at least one computer; and at least one non-transitory computer-readable storage medium storing processor-executable instructions that, when executed by the at least one computer, cause the at least one computer to perform: receiving, via at least one network, a first communication from a device different from the at least one computer; identifying, from the first communication, a request to access a web resource; generating a shuffled image that encodes a challenge text, the generating comprising: generating an initial image encoding the challenge text; dividing the initial image into image portions; and generating the shuffled image as a shuffled arrangement of the image portions; generating decoding information for revealing the challenge text encoded in the shuffled image; transmitting, via the at least one network, the shuffled image and the decoding information to the device; receiving, via the at least one network, a second communication from the device; identifying, from the second communication, a response text; and providing the device with access to the web resource based on a comparison between the challenge text and the response text.

Some embodiments are directed to a method, performed by at least one computer, the method comprising: receiving, via at least one network, a first communication from a device different from the at least one computer; identifying, from the first communication, a request to access a web resource; generating a shuffled image that encodes a challenge text, the generating comprising: generating an initial image encoding the challenge text; dividing the initial image into image portions; and generating the shuffled image as a shuffled arrangement of the image portions; generating decoding information for revealing the challenge text encoded in the shuffled image; transmitting, via the at least one network, the shuffled image and the decoding information to the device; receiving, via the at least one network, a second communication from the device; identifying, from the second communication, a response text; and providing the device with access to the web resource based on a comparison between the challenge text and the response text.

Some embodiments are directed to at least one non-transitory computer-readable storage medium storing processor-executable instructions that, when executed by at least one computer, cause the at least one computer to perform: receiving, via at least one network, a first communication from a device different from the at least one computer; identifying, from the first communication, a request to access a web resource; generating a shuffled image that encodes a challenge text, the generating comprising: generating an initial image encoding the challenge text; dividing the initial image into image portions; and generating the shuffled image as a shuffled arrangement of the image portions; generating decoding information for revealing the challenge text encoded in the shuffled image; transmitting, via the at least one network, the shuffled image and the decoding information to the device; receiving, via the at least one network, a second communication from the device; identifying, from the second communication, a response text; and providing the device with access to the web resource based on a comparison between the challenge text and the response text.

Some embodiments are directed to a device comprising: at least one hardware processor; and at least one non-transitory computer-readable storage medium storing processor-executable instructions that, when executed by the at least one hardware processor, cause the at least one hardware processor to perform: transmitting, to at least one computer and via at least one network, a communication comprising a request to access a web resource; receiving, from the at least one computer and via the at least one network, a shuffled image that encodes a challenge text and decoding information; displaying, to a user of the device, the challenge text using the shuffled image and the decoding information; receiving, from the user of the device, input specifying a response text; and transmitting, to the at least one computer and via the at least one network, a communication comprising the response text.

Some embodiments are directed to a system comprising: at least one computer; and at least one non-transitory computer-readable storage medium storing processor-executable instructions that, when executed by the at least one computer, cause the at least one computer to perform: receiving, via at least one network, a first communication from a device different from the at least one computer; identifying, from the first communication, a request to access a web resource; generating an image that encodes a challenge text, the image comprising data stored in a plurality of channels including a transparency channel, the generating comprising: generating decoding information representing the challenge text; and storing the decoding information in the transparency channel of the image; transmitting, via the at least one network, the generated image to the device; receiving, via the at least one network, a second communication from the device; identifying, from the second communication, a response text; and providing the device with access to the web resource based on a comparison between the challenge text and the response text.

Some embodiments are directed to a method comprising: receiving, via at least one network, a first communication from a device different from the at least one computer; identifying, from the first communication, a request to access a web resource; generating an image that encodes a challenge text, the image comprising data stored in a plurality of channels including a transparency channel, the generating comprising: generating decoding information representing the challenge text; and storing the decoding information in the transparency channel of the image; transmitting, via the at least one network, the generated image to the device; receiving, via the at least one network, a second communication from the device; identifying, from the second communication, a response text; and providing the device with access to the web resource based on a comparison between the challenge text and the response text.

Some embodiments are directed to at least one non-transitory computer-readable storage medium storing processor-executable instructions that, when executed by at least one computer, cause the at least one computer to perform: receiving, via at least one network, a first communication from a device different from the at least one computer; identifying, from the first communication, a request to access a web resource; generating an image that encodes a challenge text, the image comprising data stored in a plurality of channels including a transparency channel, the generating comprising: generating decoding information representing the challenge text; and storing the decoding information in the transparency channel of the image; transmitting, via the at least one network, the generated image to the device; receiving, via the at least one network, a second communication from the device; identifying, from the second communication, a response text; and providing the device with access to the web resource based on a comparison between the challenge text and the response text.

Some embodiments are directed to a device, comprising: at least one hardware processor; and at least one non-transitory computer readable storage medium storing processor-executable instructions that, when executed by the at least one hardware processor, cause the at least one processor to perform: transmitting, to at least one computer and via at least one network, a communication comprising a request to access a web resource; receiving, from the at least one computer and via the at least one network, an image that encodes challenge text in its transparency channel; displaying, to a user of the device, the challenge text using decoding information in the transparency channel of the image; receiving, from the user of the device, input specifying a response text; and transmitting, to the at least one computer and via the at least one network, a communication comprising the response text.

Some embodiments are directed to a system, comprising: at least one computer; and at least one non-transitory computer-readable storage medium storing processor-executable instructions that, when executed by the at least one computer, cause the at least one computer to perform: receiving, via at least one network, a first communication from a device different from the at least one computer; identifying, from the first communication, a request to access a web resource; transmitting, via the at least one network, software code and location information to the device, wherein the location information specifies a plurality of locations encoding a visual representation of a challenge text, and wherein the software code, when executed by an Internet browser, causes a plurality of graphical elements to be displayed at the plurality of locations in a webpage so that the webpage displays the challenge text; receiving, via the at least one network, a second communication from the device; identifying, from the second communication, a response text; and providing the device with access to the web resource based on a comparison between the challenge text and the response text.

Some embodiments are directed to a method, performed by at least one computer, the method comprising: receiving, via at least one network, a first communication from a device different from the at least one computer; identifying, from the first communication, a request to access a web resource; transmitting, via the at least one network, software code and location information to the device, wherein the location information specifies a plurality of locations encoding a visual representation of a challenge text, and wherein the software code, when executed by an Internet browser, causes a plurality of graphical elements to be displayed at the plurality of locations in a webpage so that the webpage displays the challenge text; receiving, via the at least one network, a second communication from the device; identifying, from the second communication, a response text; and providing the device with access to the web resource based on a comparison between the challenge text and the response text.

Some embodiments are directed to a system, comprising: at least one computer; and at least one non-transitory computer-readable storage medium storing processor-executable instructions that, when executed by the at least one computer, cause the at least one computer to perform: receiving, via at least one network, a first communication from a device different from the at least one computer; identifying, from the first communication, a request to access a web resource; transmitting, via the at least one network, software code to the device, wherein the software code, when executed by an Internet browser: generates a plurality of locations encoding a challenge text; and causes a plurality of graphical elements to be displayed at the plurality of locations in a webpage so that the webpage displays the challenge text; receiving, via the at least one network, a second communication from the device; identifying, from the second communication, a response text; and providing the device with access to the web resource based on a comparison between the challenge text and the response text.

Some embodiments are directed to a method, performed by a device configured to execute an Internet browser, the method comprising: transmitting, to at least one computer, a request to access a web resource; receiving, from the at least one computer, software code and location information that specifies a plurality of locations encoding a challenge text; using the Internet browser to: execute the software code; and display the challenge text to a user of the device at least in part by displaying a plurality of graphical elements at the plurality of locations in a webpage; in response to displaying the challenge text to the user, receive input text from the user; and transmitting, to the at least one computer, a communication comprising the input text.

Some embodiments are directed to a system comprising: at least one computer; and at least one non-transitory computer-readable storage medium storing processor-executable instructions that, when executed by the at least one computer, cause the at least one computer to perform: receiving, via at least one network, a first communication from a device different from the at least one computer; identifying, from the first communication, a request to access a web resource; generating an image that encodes and conceals a challenge text; generating decoding information for revealing the challenge text concealed in the image; transmitting, via the at least one network, the image and the decoding information to the device; receiving, via the at least one network, a second communication from the device; identifying a response text from the second communication; and providing the device with access to the web resource based on a comparison between the challenge text and the response text.

Some embodiments are directed to a method, performed by at least one computer, the method comprising: receiving, via at least one network, a first communication from a device different from the at least one computer; identifying, from the first communication, a request to access a web resource; generating an image that encodes and conceals a challenge text; generating decoding information for revealing the challenge text concealed in the image; transmitting, via the at least one network, the image and the decoding information to the device; receiving, via the at least one network, a second communication from the device; identifying a response text from the second communication; and providing the device with access to the web resource based on a comparison between the challenge text and the response text.

Some embodiments are directed to at least one non-transitory computer-readable storage medium storing processor-executable instructions that, when executed by at least one computer, cause at least one computer to perform: receiving, via at least one network, a first communication from a device different from the at least one computer; identifying, from the first communication, a request to access a web resource; generating an image that encodes and conceals a challenge text; generating decoding information for revealing the challenge text concealed in the image; transmitting, via the at least one network, the image and the decoding information to the device; receiving, via the at least one network, a second communication from the device; identifying a response text from the second communication; and providing the device with access to the web resource based on a comparison between the challenge text and the response text.

Some embodiments are directed to a device, comprising: at least one processor; and at least one non-transitory computer-readable storage medium storing processor-executable instructions that, when executed by the at least one processor, cause the at least one processor to perform: transmitting, to at least one computer, a communication comprising a request to access a web resource; receiving, from the at least one computer, decoding information and an image that encodes and conceals a challenge text; displaying, to a user of the device, the challenge text using the image and the decoding information; receiving, from the user of the device, input specifying a response text; and transmitting, to the at least one computer, a communication comprising the response text.

BRIEF DESCRIPTION OF DRAWINGS

Various aspects and embodiments will be described with reference to the following figures. It should be appreciated that the figures are not necessarily drawn to scale.

FIG. 4A illustrates image portions of an example image, in accordance with some embodiments of the technology described herein.

FIG. 4B illustrates a shuffled arrangement of the image portions illustrated in FIG. 4A, in accordance with some embodiments of the technology described herein.

FIG. 4C illustrates a mapping that indicates how to rearrange the shuffled arrangement of FIG. 4B to obtain the arrangement of the image portions illustrated in FIG. 4A, in accordance with some embodiments of the technology described herein.

FIG. 5A illustrates storage of image file data in a plurality of channels including color channels and a transparency channel, in accordance with some embodiments of the technology described herein.

FIG. 7B illustrates location information that specifies a plurality of locations encoding a visual representation of the challenge text of FIG. 7A, in accordance with some embodiments of the technology described herein.

FIG. 7C illustrates a plurality of graphical elements that, when displayed as part of a webpage according to the location information of FIG. 7B, form the challenge text of FIG. 7A, in accordance with some embodiments of the technology described herein.

FIG. 8 illustrates example software code that may be transmitted to a device in response to a request from the device to access a web resource, in accordance with some embodiments of the technology described herein.

FIG. 9A illustrates changing the challenge text over time, in accordance with some embodiments of the technology described herein.

DETAILED DESCRIPTION

Figure 1:
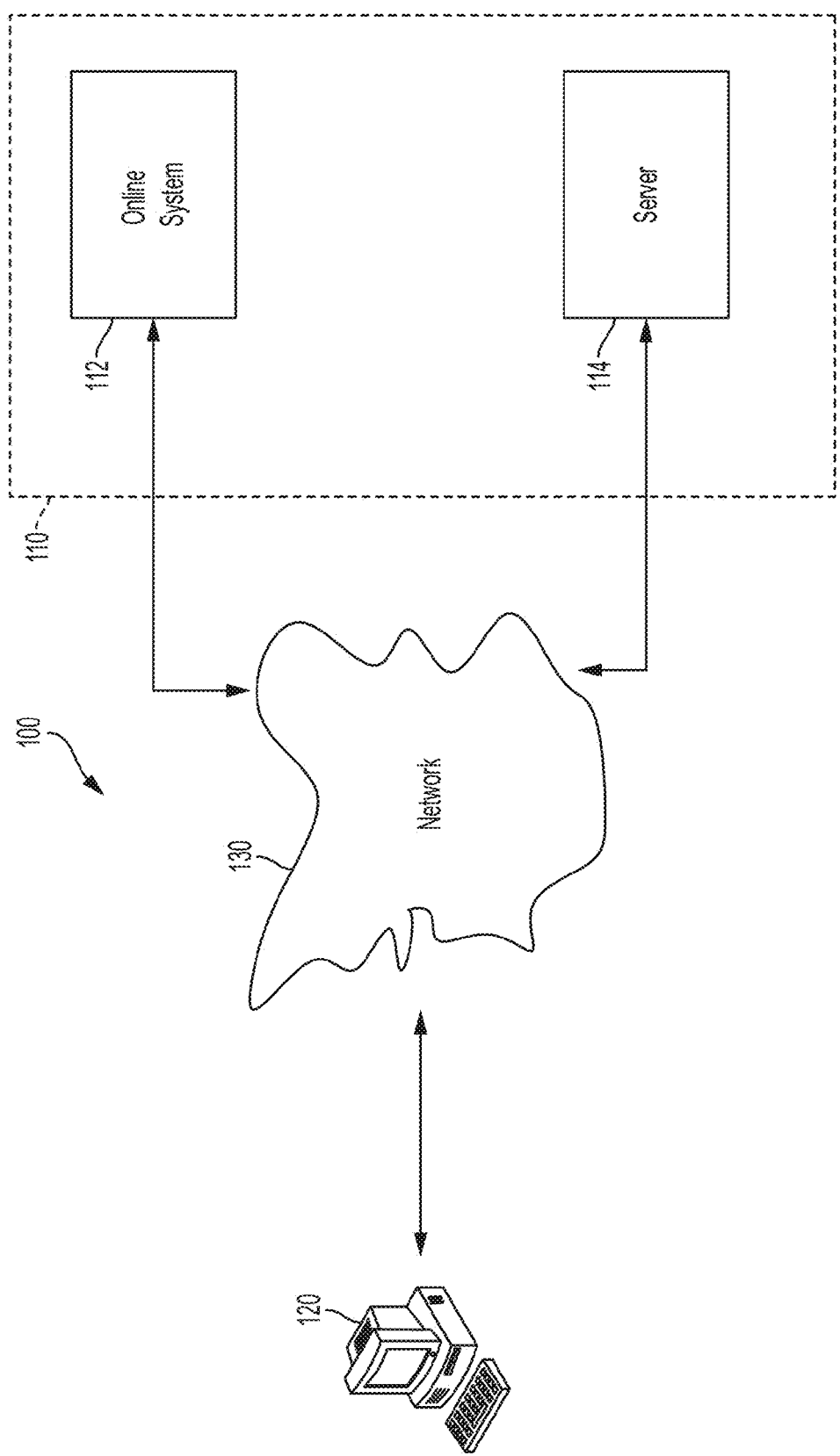
FIG. 1 shows an illustrative environment in which aspects of the technology described herein may be implemented.

The inventors have recognized and appreciated various technical challenges to overcoming sophisticated attacks on online systems. Increasingly, such systems are experiencing more sophisticated attacks and technical exploits. This presents technical challenges, especially given the large overall volume of digital interactions handled by modern online systems.

The inventors have recognized and appreciated that systems that rely on conventional CAPTCHA challenges for security, for example to distinguish between human users and bots, may be exploited by malicious entities, and may be improved upon. A malicious entity may solve a conventional CAPTCHA challenge by using a software bot to download an image representing a distorted text string and apply optical character recognition (OCR) techniques to identify the distorted text. As a result of continual improvements to widely available OCR technology, a software bot can solve a conventional CAPTCHA challenge (e.g., by correctly identifying the distorted text within the challenge) with a high probability of success. Systems that rely on conventional animated CAPTCHA challenges are also vulnerable to attack by software bots. An animated CAPTCHA challenge contains a series of static images, which are used to generate an animation effect. A software bot may download the series of static images and then use OCR technology to solve the CAPTCHA challenge.

The inventors have also recognized and appreciated that applying OCR techniques to an image representing a distorted text string does not require displaying the image, let alone a webpage containing the image, which allows a software bot to solve a conventional CAPTCHA challenge without using a significant amount of computational resources. For example, extracting text from a CAPTCHA image without having to actually display the image file (e.g., by creating an instance of an Internet browser to display a webpage containing the CAPTCHA image) allows OCR-based CAPTCHA attacks to be performed using inexpensive web servers having limited computational resources. Moreover, commercially available OCR techniques may be easily scripted to perform actions in bulk and applied to a large number of conventional CAPTCHA images. This allows malicious entities to solve a large number of conventional CAPTCHA challenges without having to invest in expensive computational resources. As a result, malicious entities may use OCR to carry out a high volume of attacks at low cost.

Accordingly, the inventors have developed a new class of CAPTCHA challenges, which are significantly more secure against attacks by software bots than conventional CAPTCHA challenges. Although these new types of CAPTCHA challenges may be solved automatically by a software bot, they are designed to require the software bot to expend a significant amount of computational resources in order to do so. For example, some types of CAPTCHA challenges developed by the inventors require launching an instance of an Internet browser for each CAPTCHA challenge to be solved. Launching an instance of an Internet browser requires using an order of magnitude greater amount of memory (e.g., over 100 megabytes) than is used by software bots using OCR to solve conventional CAPTCHA challenges (e.g., 10 megabytes). As another example, some types of CAPTCHA challenges developed by the inventors require that specialized hardware, such as a graphics processing unit (GPU), be used to solve the challenges. Inexpensive web servers typically used by malicious entities to solve conventional CAPTCHA challenges may not include any such specialized hardware. By requiring a significantly greater amount of computational resources to be used by malicious entities to solve even a single CAPTCHA challenge, the CAPTCHA techniques described herein provide a significant barrier to malicious entities wishing to carry out a high volume of attacks.

Some embodiments described herein address all of the above-described issues that the inventors have recognized with conventional CAPTCHA-based approaches for distinguishing between human users and bots. However, it should be appreciated that not every embodiment described herein addresses every one of these issues. It should also be appreciated that embodiments of the technology described herein may be used for purposes other than addressing the above-discussed issues of conventional CAPTCHA-based approaches for distinguishing between human users and bots.

Accordingly, some embodiments are directed to CAPTCHA techniques that provide a greater degree of security against attacks by malicious entities using software bots than provided by conventional CAPTCHA challenge techniques.

In some embodiments, a system may perform a CAPTCHA challenge technique by: (1) receiving a communication from a requesting device; (2) identifying, in the communication, a request to access a web resource; (3) obtaining an image that encodes and conceals a challenge text and decoding information that may be used by the requesting device to extract the concealed challenge text from the image; (4) transmitting the image and the decoding information to the requesting device; (5) receiving, from the requesting device, a responsive communication; (6) identifying from the responsive communication a response text; and (7) providing the requesting device with access to the requested web resource if the response text matches the challenge text.

In some embodiments, simply displaying the image that encodes and conceals the challenge text will not reveal the challenge text. As a result, applying conventional OCR techniques to the image that encodes and conceals the challenge text will not identify the challenge text concealed in the image. Rather, the requesting device needs to use the decoding information to process the image so as to extract the concealed challenge text, which may require using an instance of one or more application programs (e.g., an instance of an Internet browser) and/or specialized hardware (e.g., a GPU).

In some embodiments, the system performing CAPTCHA challenge technique may further transmit software code to the requesting device. The software code, when executed by the requesting device, may use the decoding information to extract and/or facilitate displaying of the challenge text encoded in the image. For example, the software code may comprise software code (e.g., JAVASCRIPT code) that, when executed by an Internet browser running on the requested device, may extract and/or facilitate displaying of the challenge text encoded in the image.

In some embodiments, the decoding information: (1) may be part of the image encoding and concealing a challenge text; and (2) may comprise data representing the challenge text. For example, in some embodiments, the data in the image encoding and concealing a challenge text may be organized in multiple channels such as, for example, color channels (e.g., red, green, and blue channels) and a transparency channel (sometimes termed an "alpha" channel). The decoding information may be stored entirely in one of the multiple channels such as, for example, the transparency channel and may comprise values (e.g., pixel values) representing the challenge text. When the image is displayed against a white background, the challenge text encoded and concealed in the transparency channel is not shown. Accordingly, in order to reveal the challenge text, in some embodiments, an Internet browser may execute software code (e.g., JAVASCRIPT) to extract data from the transparency channel and use these data to generate an image containing the challenge text (e.g., using HTML elements and/or OpenGL elements).

In some embodiments, the image encoding and concealing a challenge text in its transparency channel may also store information representing a different "fake" challenge text in its other (e.g., RGB) channels. In this way, when the image is displayed against a white background, the true challenge text is not shown and, instead, the fake challenge text is shown. This feature may be useful for identifying malicious attempts to solve the CAPTCHA challenge. For example, a software bot may not know that the true challenge text is concealed in the transparency channel of the image and may extract and send the fake challenge text to a system that it is attempting to access. When the system detects that the fake challenge text has been sent back, it may deny the requesting device access.

Accordingly, in some embodiments, a system may perform a CAPTCHA challenge technique by: (1) receiving, via at least one network, a communication from a device; (2) identifying, from the communication, a request to access a web resource; (3) generating an image that encodes a challenge text, the image comprising data stored in a plurality of channels including a transparency channel, the generating comprising: generating decoding information representing the challenge text (e.g., the decoding information may include saturation values for one or more pixel positions; and storing the decoding information in the transparency channel of the image; (4) transmitting, via the at least one network, the generated image to the device; (5) receiving, via the at least one network, a second communication from the device; (6) identifying, from the second communication, a response text; and (7) providing the device with access to the web resource based on a comparison between the challenge text and the response text.

In some embodiments, the technique further comprises sending software code from the at least one computer to the device. The software code, when executed by an Internet browser executing on the device, uses the decoding information in the transparency channel of the image to cause graphical elements to be displayed in a webpage so that the webpage displays the challenge text. The graphical elements may include one or more HTML elements (e.g., HTML canvas elements and HTML span elements) and/or one or more OpenGL elements. In some embodiments, the software code may include OpenGL instructions that may be executed by at least one graphical processing unit (GPU) in the device to render the graphical elements.

In some embodiments, challenge text may be encoded and concealed in an image in ways other than storing a representation of the challenge text in the transparency channel of the image. For example, in some embodiments, the image encoding and concealing the challenge text may be generated in two steps. First, an initial image encoding the challenge text (e.g., a picture of the challenge text) may be divided into image portions. Next, the image portions may be spatially shuffled to obtain an image encoding and concealing the challenge text. In this way, the image encoding and concealing the challenge text may be a shuffled arrangement of the image portions of the initial image. In such embodiments, the decoding information may specify how to rearrange ("unshuffle") the shuffled arrangement of image portions in order to obtain the initial image and reveal the concealed challenge text.

Accordingly, in some embodiments, a system may perform a CAPTCHA challenge technique by: (1) receiving, via at least one network, a communication from a device; (2) identifying, from the communication, a request to access a web resource; (3) generating a shuffled image that encodes a challenge text, the generating comprising: generating an initial image encoding the challenge text; dividing the initial image into image portions; and generating the shuffled image as a shuffled arrangement of the image portions (e.g., by re-arranging the image portions at random); (4) generating decoding information for revealing the challenge text encoded in the shuffled image; (5) transmitting, via the at least one network, the shuffled image and the decoding information to the device; (6) receiving, via the at least one network, another communication from the device; (7) identifying, from the other communication, a response text; and (8) providing the device with access to the web resource based on a comparison between the challenge text and the response text.

In some embodiments, the technique includes transmitting, to the device, software code that, when executed by the device, uses the decoding information to facilitate displaying, by the device, of the challenge text encoded in the shuffled image. The software code may be JAVASCRIPT software code for execution by an Internet browser executing on the device.

In some embodiments, generating the decoding information may include generating a mapping that specifies how to rearrange the shuffled arrangement of image portions to obtain the initial image. For example, generating the mapping may include: generating first information specifying a first location in the initial image for a first image portion in the shuffled arrangement of image portions; and generating second information specifying a second location in the initial image for a second image portion in the shuffled arrangement of image portions, wherein the first location is different from the second location, and wherein the first image portion is different from the second image portion.

In some embodiments, a requesting device (e.g., a user's client device) may: (1) send to a server a request to access a web resource; (2) receive, from the server, an image that encodes and conceals a challenge text and associated decoding information; (3) use the decoding information to display the challenge text to a user (e.g., by using an Internet browser to show the challenge text to the user via a display coupled to requesting device); (4) receive, from the user, a response text; and (5) transmit the response to text to the server.

In some embodiments, the requesting device may receive an image that encodes and conceals a challenge text in its transparency channel. The requesting device may then access the data in the transparency channel and use these data to display the challenge text to the user. In some embodiments, the requesting device may receive, from the server, software code (e.g., JAVASCRIPT) that, when executed by an Internet browser on the requesting device, will access the data in the transparency channel and use these data to display the challenge text to a user. For example, the data in the transparency channel may indicate a saturation value for each of one or more pixels, and the software code may generate graphical elements (e.g., HTML and/or OpenGL elements) at the pixels based on the saturation values (e.g., an HTML element may be generated at the location of a pixel and the color of the HTML element may be assigned based on the saturation value).

In some embodiments, the requesting device may receive: (1) an image that is a shuffled arrangement of image portions of an initial image representing the challenge text; and (2) decoding information that specifies a mapping, which indicates how to rearrange the shuffled arrangement so as to reveal the initial image. The requesting device may display the challenge text by rearranging the shuffled arrangement of image portions in accordance with the mapping specified by the decoding information. In some embodiments, the requesting device may receive, from the server, software code (e.g., JAVASCRIPT) that, when executed by an Internet browser on the requesting device, will rearrange the shuffled arrangement of image portions to reveal the initial image and the challenge text concealed therein.

In some embodiments, a system may perform a CAPTCHA challenge technique without sending, to a requesting device requesting access to a web resource, any image associated with (e.g., representing and/or concealing) the challenge text. Instead, the system may send, to the requesting device, software code that, when executed by an Internet browser executing on the requesting device, would cause multiple graphical elements (e.g., span elements, HTML canvas elements; elements rendered by executing OpenGL instructions) on a webpage to be displayed at particular locations so as to cause the challenge text to be displayed in the webpage. In such embodiments, since there is no image associated with the challenge text, a software bot would not be able to identify the challenge text simply by downloading an image and applying OCR technology to it.

In some embodiments, a system may perform a CAPTCHA challenge technique by: (1) receiving, from a requesting device (e.g., a user's client device) a communication and identifying, from the communication, a request to access a web resource; (2) transmitting software code and location information to the requesting device, the location information specifying multiple locations encoding a visual representation of challenge text (the location information may, for example, comprise location coordinates), the software code, when executed by an Internet browser executing on the requesting device, causing multiple graphical elements (e.g., span elements, HTML canvas elements, elements generated by using a graphics processing unit, for example, by executing OpenGL instructions) to be displayed at the multiple locations in a webpage so as to cause the challenge text to be displayed; (3) receiving a second communication from the requesting device and identifying a response text from the second communication; and (4) providing the requesting device with access to the requested web resource based on a comparison between the challenge text and the response text.

In some embodiments, the system performing the CAPTCHA challenge technique may generate the location information and the software code. The system may further generate a webpage that includes the location information and the software code, and may transmit the generated webpage to the requesting device. In turn, the Internet browser executing on the requesting device may execute the software code in the webpage so that multiple graphical elements are displayed in the webpage at the locations specified by the location information, which in turn causes the challenge text to be displayed in the webpage. The software code may further set visual characteristics (e.g., color, shading, opacity, size, etc.) of the graphical elements to be different from that of the background of the webpage so as to display the challenge text on the requesting device. For example, the software code may set the color of at least some (e.g., all) of the graphical elements to be different from the background color of the webpage.

In some embodiments, the software code may be configured to, when executed by the Internet browser, set colors of graphical elements to different colors at different times. In some embodiments, the software code, when executed by the Internet browser, may cause the webpage to initially display a first text different from the challenge text and subsequently, after a threshold amount of time, display the challenge text.

In some embodiments, the system performing a CAPTCHA challenge may use challenge tokens (e.g., single-use challenge tokens) to validate that the response received from the same device as the one to which the CAPTCHA challenge was sent. For example, upon receiving the second communication from the requesting device, the system may identify a challenge token in the second communication and use the identified challenge token to validate the second communication. In some embodiments, the challenge token may comprise a time stamp of a communication and/or a security key specific to the challenge text. The system may verify that the time stamp of the communication is within a valid time range of when the CAPTCHA challenge was sent to the requesting device. Additionally or alternatively, the system may verify that the security key matches a key associated with the challenge text.

In some embodiments, rather than sending software code and location information to the requesting device, the system may send software code that is configured to display graphical elements at a set of locations so as to show the challenge text. The software code may include the information specifying the set of locations (e.g., as parameters, configuration data, program instructions, etc.) and the system need not transmit location information separately from the software code.

In some embodiments, the software code may be configured to, when executed by the Internet browser, generate the location coordinates at an initial time and subsequently change the location coordinates. The location coordinates may, for example, change aperiodically after the initial time. In this way, the location, appearance, and/or content of the challenge text may be varied over time in a non-repeating manner.

In some embodiments, a requesting device (e.g., a user's client device) may: (1) send to a server a request to access a web resource; (2) receive, from the server, software code and, in some embodiments, location information; (3) use an Internet browser to execute the software code (e.g., by providing the software code with the location information in embodiments where the location information is received) to display the challenge text to a user, for example, by displaying graphical elements (e.g., span elements, HTML canvas elements, elements generated by using a GPU to interpret OpenGL instructions in the software code) at a plurality of locations determined using the software code and, optionally, the location information; (4) receive, from the user, a response text; and (5) transmit the response text to the server.

It should be appreciated that the techniques introduced above and discussed in greater detail below may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1 illustrates an illustrative environment 100 in which aspects of the technology described herein may be implemented. The illustrative environment 100 includes system 110 and client device 120 communicatively coupled to system 110 via network 130. System 110 includes challenge text system 112 and server 114. The network 130 may be the Internet, a local area network, a wide area network, and/or any other suitable type of communications network, as aspects of the technology described herein are not limited in this respect.

In some embodiments, a user may use the client device 120 to engage in one or more digital interactions with server 114. In some instances, during a digital interaction with server 114, a user may request to access a web resource. For example, the user may request to access a webpage hosted by and/or accessible through server 114. As another example, the user may request to perform a transaction (e.g., make a purchase, create an account, transfer money from one account to another, etc.) on a website hosted by and/or accessible through server 114. As another example, the user may request to check e-mail, download multimedia content (e.g., an image, a video, a music file), stream multimedia content, and/or participate in an online game at least in part by using server 114. It should be appreciated that a user may request to access any other suitable type of web resource in addition to, or instead of, those mentioned above, as aspects of the technology described herein are not limited to any particular type(s) of web resource.

It should also be appreciated that a user of client device 120 may engage in other types of digital interactions in addition to, or instead of, those mentioned above, as aspects of the technology described herein are not limited to the analysis of any particular type of digital interactions. Also, digital interactions are not limited to interactions that are conducted via an Internet connection. For example, a digital interaction may involve an ATM transaction over a leased telephone line.

In some embodiments, during a digital interaction between client device 120 and server 114, a client device 120 may send a communication to the server 114, requesting permission to access to a web resource. In some embodiments, the communication may be sent from an application program and/or operating system executing on the client device 120. For example, in some embodiments, a communication requesting permission to access a web resource may be sent to server 114 by an Internet browser executing on the client device 120, in response to the user of client device 120 clicking on a link in a webpage displayed by the Internet browser. It should be appreciated, however, that the request for access to a web resource is not limited to being triggered by a user clicking on a link and may be triggered in any other suitable way.

As discussed herein, in some embodiments, it may be desirable to allow human users to access one or more web resources and to limit access to these web resources by non-human actors such as software bots and/or scripts. Accordingly, in some embodiments, in response to receiving, from client device 120, a communication including a request to access a web resource, system 114 may transmit a challenge to the client device 120 in an effort to determine whether a human user is attempting to access the web resource or whether the communication was generated by a (e.g., malicious) software bot. In some embodiments, the system 114 may obtain the challenge from challenge text system 112 prior to transmitting the challenge to the client device 120. Subsequently, server 114 may receive a response to the challenge from client device 120. Based on the received response to the challenge, the server 114 may allow client device 120 to access the requested web resource.

In some embodiments, the challenge may be a CAPTCHA challenge of any suitable type including any of the types of CAPTCHA challenges described herein. For example, the CAPTCHA challenge may include an image that encodes and conceals a challenge text and decoding information for revealing the challenge text concealed in the image. Upon receiving the image and the decoding information, the client device 120 may use the decoding information to reveal the challenge text concealed in the image, in accordance with some embodiments of the technology described herein. As another example, the CAPTCHA challenge may be communicated to the client device 120 without using an image encoding a challenge text. Rather, in some embodiments, server 114 may send, to the client device 120, software code that when executed by an Internet browser on the client device 120, causes the Internet browser to display the challenge text. For example, in some embodiments, the software code, when executed by an Internet browser, may be configured to display a plurality of graphical elements (e.g., span elements, HTML canvas elements, OpenGL elements) at a specified set of locations in a webpage, so that the webpage displays the challenge text.

In some embodiments, server 114 may generate a CAPTCHA challenge, send the CAPTCHA challenge to client device 120, receive a response to the CAPTCHA challenge from the client device 120, and determine whether the response includes a correct answer to the CAPTCHA challenge. In some embodiments, the server 114 may perform all of these acts on its own. In other embodiments, server 114 may interact with challenge text system 112 to perform one or more of these acts. For example, in some embodiments, the challenge text system 112 may generate the CAPTCHA challenge and/or verify whether the response to the CAPTCHA challenge is correct.

Accordingly, in some embodiments, in response to receiving a request from a client device 120 to access a web resource, the server 114 may request a challenge (e.g., a CAPTCHA challenge) from the challenge text system 112. (In other embodiments, the challenge text system 112 may have provided one or more challenges to server 114 for subsequent use and done so before the server 114 received the request from the client device to access a web resource). The server 114 may: (1) provide the challenge generated by challenge text system 112 to client device 120; (2) receive, from the client device 120, a response to the challenge; (3) send the received response to challenge text system 112 for validation; and (4) receive from the challenge text system 112 information indicating whether the response to the challenge text was valid. For example, challenge text system 112 may determine that the response to the challenge was valid if the response includes text that matches the text of the challenge text. When the server 114 receives information from challenge text system 112 indicating that the response to the challenge was valid, the server 114 may provide the client device 120 with access to the requested web resource.

In other embodiments, rather than forwarding a challenge to server 114 and validating a response provided by the client device to server 114, challenge text system 112 may interact with client device 120 directly. For example, in some embodiments, in response to receiving a notification from server 114 that client device 120 has requested access to a web resource, challenge text system 112 may: (1) transmit a challenge to client device 120; (2) receive a response to the challenge from client device 120; and (3) validate the response. In such embodiments, when the challenge text system 112 determines that the response to the challenge is correct, the challenge text system 112 may provide an indication to server 114 that the client device has been validated. In response, server 114 may provide client device 120 with access to the requested web resource.

In some embodiments, challenge text system 112 may comprise one or multiple computing devices (e.g., one or multiple servers). The computing device(s) may be configured to execute software configured to generate one or more CAPTCHA challenges of the types described herein and/or validate responses to the CAPTCHA challenges.

In some embodiments, server 114 may comprise one or more multiple computing devices (e.g., one or multiple servers). Thus, server 114 may be configured to host one or more services and/or applications on a single or multiple devices. In some embodiments, server 114 may host and/or provide access to one or more websites of any suitable type. For example, the websites may include static content (e.g., static webpages, images, files) and/or dynamic content (e.g., streaming content, time-dependent content). As another example, the websites may allow users to engage in transactions (e.g., opening an account, making a purchase, transferring money, etc.)

In some embodiments, the client device 120 may be a portable device. For example, client device 120 may a laptop computer, a table computer, a smartphone, a personal digital assistant, a smartwatch, and/or any other type of portable device capable of requesting access to a web resource. In other embodiments, the client device 120 may be a fixed device. For example, client device 120 may be a desktop computer, a rack-mounted computer, and/or any other type of portable device capable of requesting access to a web resource.

Figure 2A:
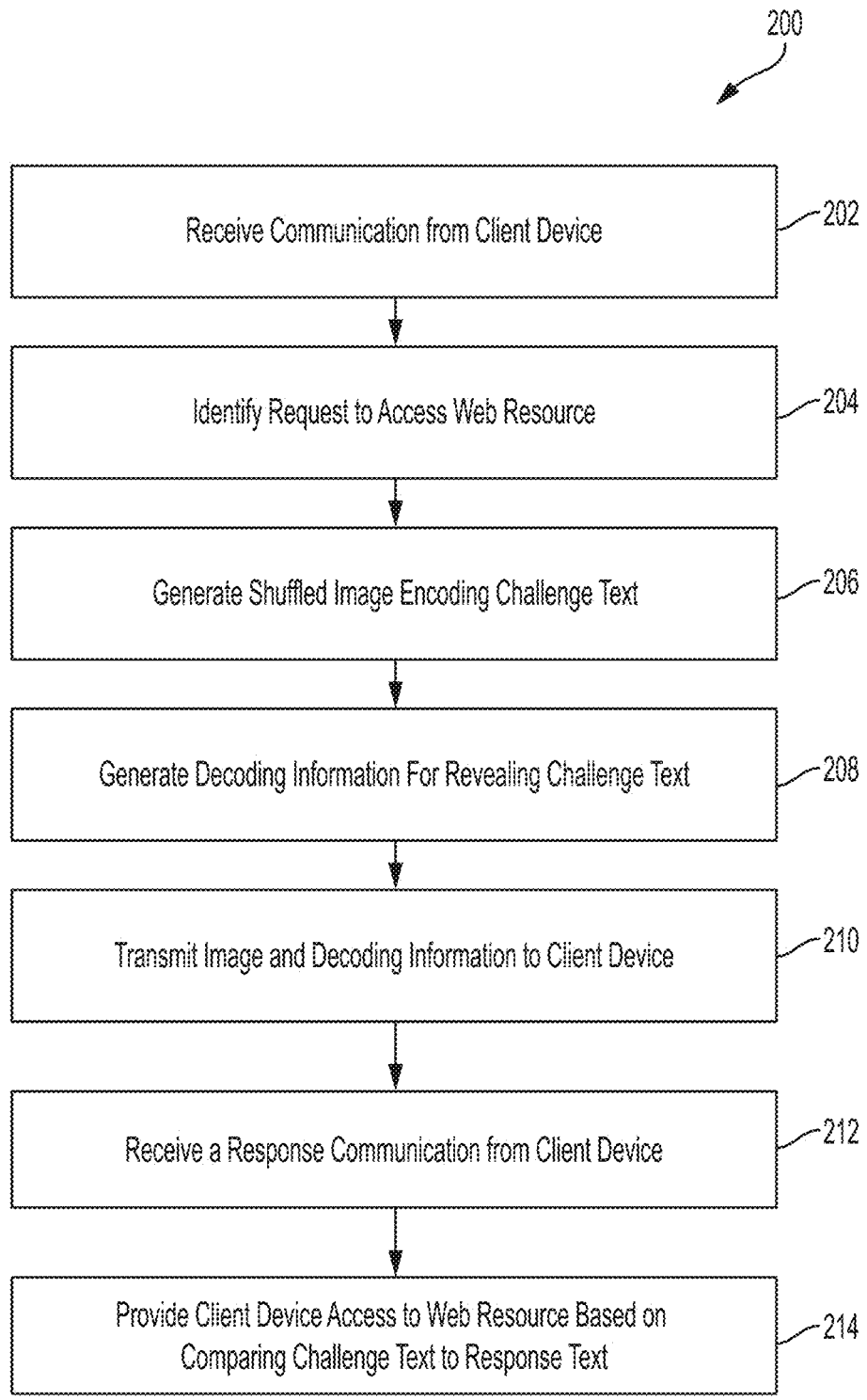
FIG. 2A is a flowchart of an illustrative process, performed by at least one server, for determining whether a device may access a web resource, in accordance with some embodiments of the technology described herein.

FIG. 2A is a flowchart of an illustrative process 200 for determining whether a device may access a web resource. The process 200 may be performed by any suitable system and/or computing device(s) and, for example, may be performed by system 110 described with reference to FIG. 1.

Process 200 begins at act 202, where the system executing process 200 receives a communication from a requesting device (e.g., client device 120 described with reference to FIG. 1) via at least one network. In some embodiments, the communication may be generated by an application program and/or an operating system executing on the requesting device. For example, the communication may be generated by an Internet browser of any suitable type. In some embodiments, the communication may be generated by the Internet browser executing on the requesting device in response to a user clicking on a link in a webpage being displayed by the Internet browser or in response to any other suitable trigger. The communication may include a request to access a web resource. Examples of web resources are provided herein. The communication may conform to any suitable communications protocol and may be in any suitable format, as aspects of the technology described herein are not limited in this respect.

Next, process 200 proceeds to act 204, where the system executing process 200 identifies, from the communication, a request to access a web resource. In some embodiments, the system may analyze the communication received at act 202 and detect that the user has requested to access a specific web resource. For example, the communication may comprise information associated with an object that a user has selected on a website. The object may be a uniform resource locator (URL). Based on the selected URL, the system may identify a request to access a particular web resource. However, it should be appreciated, that a request to access a web resource may be identified from the communication in any other suitable way, as aspects of the technology described herein are not limited in this respect.

Next, process 200 proceeds to acts 206, 208, and 210, where the system executing process 200 generates a CAPTCHA challenge and transmits the generated challenge to the requesting device. In particular, at act 206, the system generates an image that encodes and conceals a challenge text by generating a shuffled image encoding the challenge text. At act 208, the system generates decoding information that may be used by the requesting device to reveal the challenge text concealed in the shuffled image. The generated shuffled image and decoding information are transmitted to the requesting device at act 210.

In some embodiments, at act 206, the shuffled image encoding a challenge text may be generated as a shuffled arrangement of image portions of an initial image representing a challenge text (e.g., the initial image may be a picture of the challenge text) and the decoding information may specify how to rearrange portions of the image to recover the initial image so that the challenge text may be revealed.

Figure 4D:
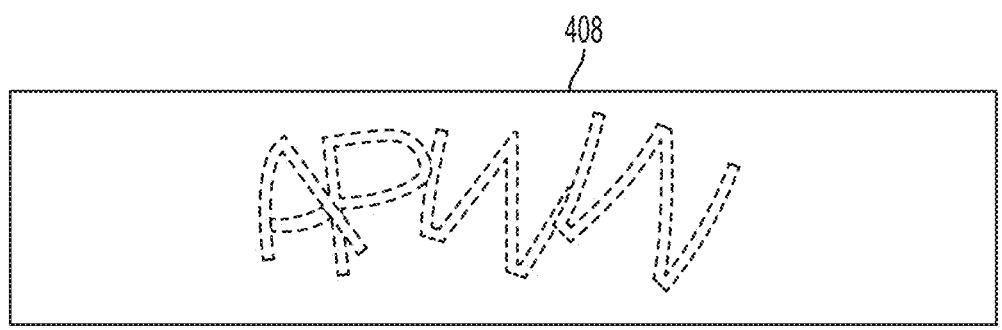
FIG. 4D illustrates an initial image, in accordance with some embodiments of the technology described herein.
Figure 4E:
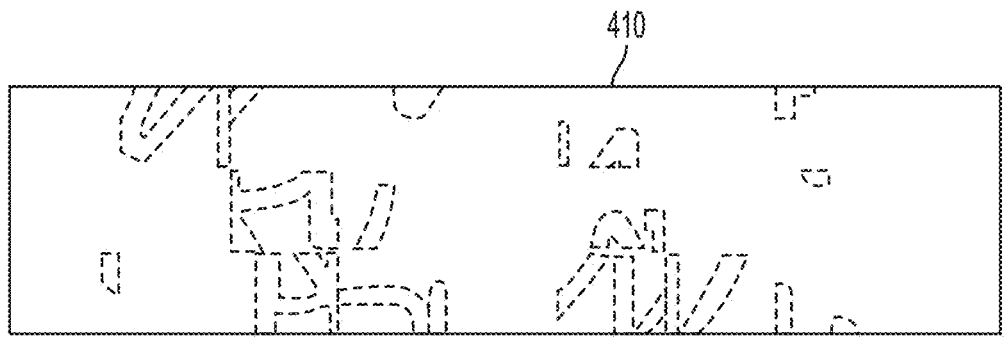
FIG. 4E illustrates a shuffled arrangement of image portions of the initial image of FIG. 4D, in accordance with some embodiments of the technology described herein.

For example, in some embodiments, the shuffled image encoding the challenge text may be generated by: (1) obtaining an initial image representing (but not concealing) the challenge text; (2) dividing the initial image into a plurality of image portions; and (3) spatially re-arranging the image portions relative to one another so as to conceal the challenge text represented by the initial image. For example, as illustrated in FIGS. 4A and 4B, initial image 402 may be divided into 10 portions (arranged as a 2×5 grid), and these portions may be spatially rearranged relative to one another to obtain shuffled arrangement 404. As another example, the initial image 408 shown in FIG. 4D and representing the challenge text "APWW" may be divided into image portions, and these portions may be spatially rearranged relative to one another to obtain shuffled arrangement 410, as shown in FIG. 4E. As may be seen from the illustrative example of FIG. 4E, generating a scrambled image such as image 410 effectively prevents automated software bots from identifying the challenge text using the raw image alone. The initial image may be divided into any suitable number of portions, as aspects of the technology described herein are not limited in this respect. The image portions of the initial image may be rearranged in a random order (e.g., by using output from a random number generator and/or a pseudo-random number generator) or in any other suitable way, as aspects of the technology described herein are not limited by the way in which portions of the initial image are rearranged to obtain a shuffled image encoding the challenge text.

In some embodiments, the decoding information generated at act 208 may specify a mapping for how to rearrange portions of the shuffled arrangement to recover the initial image representing the challenge text. An illustrative example of such a mapping 406 is shown in FIG. 4C, which may be used to rearrange image portions in the shuffled arrangement 404 to obtain the initial image 402. A similar mapping may be created to revert from the shuffled arrangement 410 shown in FIG. 4E to the initial image 408 shown in FIG. 4D. Although the mapping illustrated in FIG. 4C is a table, it should be appreciated that such a mapping may be implemented using any suitable data structure(s) and/or in any suitable format, as aspects of the technology described herein are not limited in this respect. For example, in some embodiments, the mapping 406 may comprises a series of instructions (e.g., "move block 1 to the left by 3 positions, move block 2 to down by 1 positions, etc.). The instructions may be in any suitable format and software configured to process the instructions to rearrange the shuffled arrangement so as to reveal the challenge text may be configured to parse the instructions.

At act 210, the shuffled image encoding the challenge text (generated at act 206) and the decoding information (generated at act 208) may be transmitted to the requesting device. In some embodiments, the system executing process 200 may additionally send software code to the requesting device that, when executed by the requesting device (e.g., by an Internet browser or other application program executing on the requesting device), may produce the initial image from the shuffled image by using the decoding information. For example, the software code, when executed, may rearrange portions of the shuffled image by using the mapping in the decoding information. In some embodiments, the software code may be transmitted to the requesting device as part of a webpage, though this not a limitation of aspects of the technology described herein. In some embodiments, the software code may be a script (e.g., written in JAVASCRIPT) or application program (e.g., a Java applet), and/or any other suitable type of software code written in any suitable scripting and/or programming language.

After transmitting a CAPTCHA challenge to the requesting device at act 210, the system performing process 200 may receive a response communication from the requesting device at act 212. The communication may include a response text purporting to be the solution to the CAPTCHA challenge. For example, the response text may be the text input by a human user of the requesting device in response to being presented, by the requesting device, with an image of the challenge text. In some embodiments, the communication may further include a token associated with the CAPTCHA challenge. The token may comprise a time stamp (e.g., a time stamp indicating a time at which the response was generated) and/or a security key specific to the challenge text. The system may use the token to verify that the response to the CAPTCHA challenge is a response to the transmitted CAPTCHA challenge (as opposed to some other CAPTCHA challenge) and that it was generated within a threshold time of the CAPTCHA challenge being sent to the requesting device.

Next, at act 214, the response text is identified from the communication received at act 212. The response text may be compared to the challenge text to determine whether the response text matches the challenge text. In some embodiments, when the response text matches the challenge text exactly, the system executing process 200 may grant the requesting device access to the requested web resource and deny access when the response text does not match the challenge text exactly. In other embodiments, an exact match is not required and a threshold number of errors may be specified. For example, when the number of errors between the response text and the challenge text is below the threshold number of errors (e.g., one error, two errors, or three errors), the system executing process 200 may allow the requesting device to access to the requested web resource and deny access when the number of errors between the response text and the challenge text is greater than (or greater than or equal to) the threshold number of errors.

It should be appreciated that process 200 is illustrative and that there are variations. For example, although in the illustrated embodiment of FIG. 2A, the shuffled image encoding the challenge text and associated decoding information are generated during process 200, in other embodiments, the shuffled image and associated decoding information may be generated prior to the start of execution of process 200. In such embodiments, during process 200, the previously generated image and decoding information are accessed at acts 206 and 208.

Figure 2B:
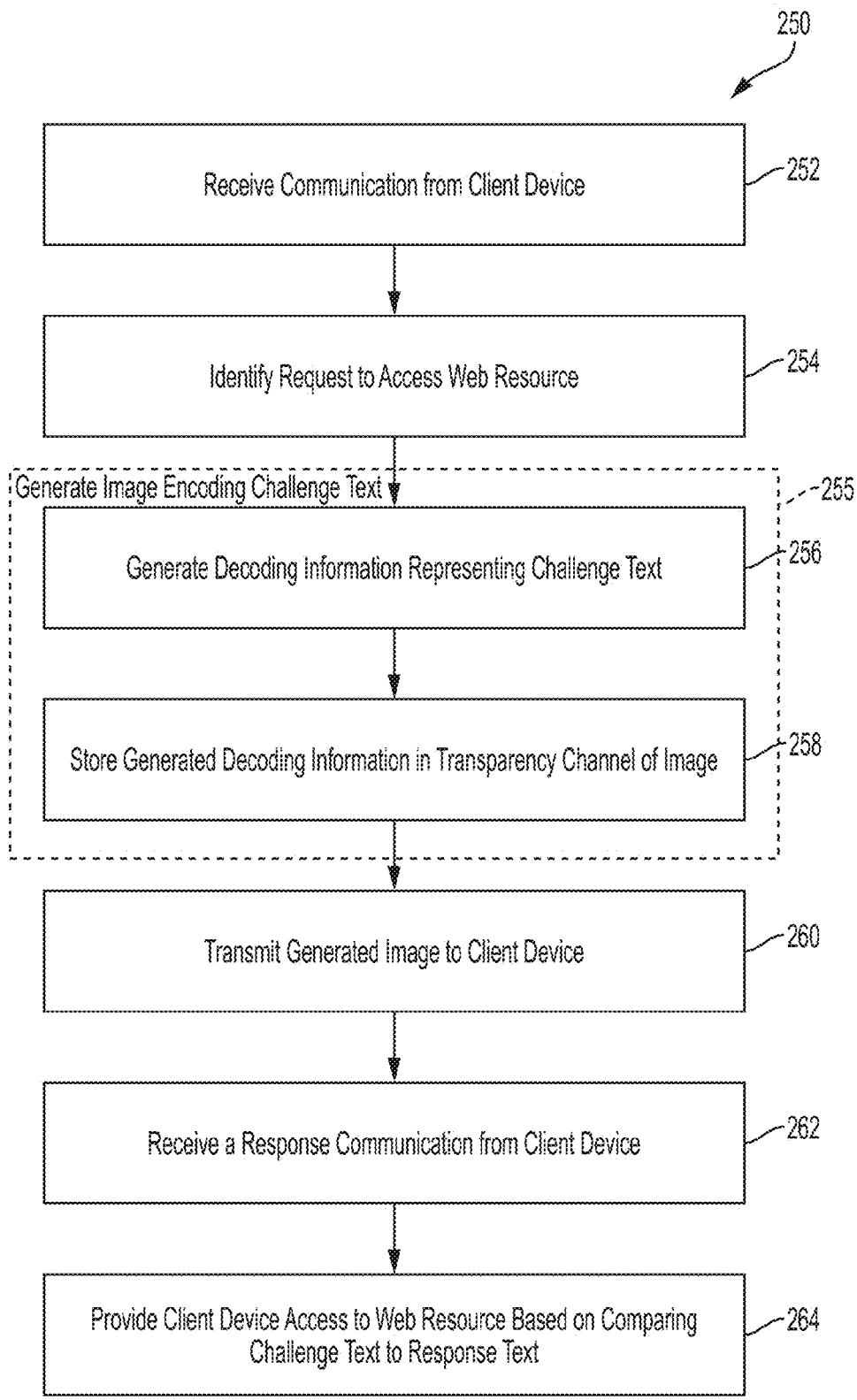
FIG. 2B is a flowchart of another illustrative process, performed by at least one server, for determining whether a device may access a web resource, in accordance with some embodiments of the technology described herein.

FIG. 2B is a flowchart of an illustrative process 250 for determining whether a device may access a web resource. The process 250 may be performed by any suitable system and/or computing device(s) and, for example, may be performed by system 110 described with reference to FIG. 1.

Process 250 begins at act 252, where the system executing process 250 receives a communication from a requesting device (e.g., client device 120 described with reference to FIG. 1) via at least one network. The communication may be generated by an application program and/or an operating system executing on the requesting device. For example, the communication may be generated by an Internet browser of any suitable type. In some embodiments, the communication may be generated by the Internet browser executing on the requesting device in response to a user clicking on a link in a webpage being displayed by the Internet browser or in response to any other suitable trigger. The communication may include a request to access a web resource. Examples of web resources are provided herein. The communication may conform to any suitable communications protocol and may be in any suitable format, as aspects of the technology described herein are not limited in this respect.

Next, process 250 proceeds to act 254, where the system executing process 250 identifies, from the communication, a request to access a web resource. In some embodiments, the system may analyze the communication received at act 252 and detect that the user has requested to access a specific web resource. For example, the communication may comprise information associated with an object that a user has selected on a website. The object may be a uniform resource locator (URL). Based on the selected URL, the system may identify a request to access a particular web resource. However, it should be appreciated, that a request to access a web resource may be identified from the communication in any other suitable way, as aspects of the technology described herein are not limited in this respect.

Next, process 250 proceeds to acts 255 and 260, where the system executing process 250 generates a CAPTCHA challenge and transmits the generated challenge to the requesting device. In particular, at act 255, the system generates an image that encodes the challenge text in metadata stored in the transparency channel of the image. The generated image is transmitted to the requesting device at act 260. The requesting device may extract the metadata from the transparency channel of the generated and transmitted image to reveal the challenge text.

In some embodiments, generating an image that encodes the challenge text at act 255 comprises: (1) generating decoding information representing the challenge text at act 256; and (2) storing the generated decoding information in a transparency channel of a multi-channel image at act 258. The decoding information may store a saturation value (e.g., a value between 0 and 255) for each of at least some of (e.g., all) of the image pixels. The multi-channel image may store data representing an image of text different from the challenge text in the color channels of the generated image.

For example, in some embodiments, generating an image that encodes the challenge text at act 255 comprises: (1) generating decoding information representing the challenge text at act 256; (2) creating a multi-channel image including multiple data channels including one or more color channels (e.g., red, green, and blue channels) and a transparency channel (sometimes termed an "alpha" channel); (3) storing the decoding information in the transparency channel of the multi-channel image; and (4) storing another image in the color channel(s) of the multi-channel image.

Figure 5B:
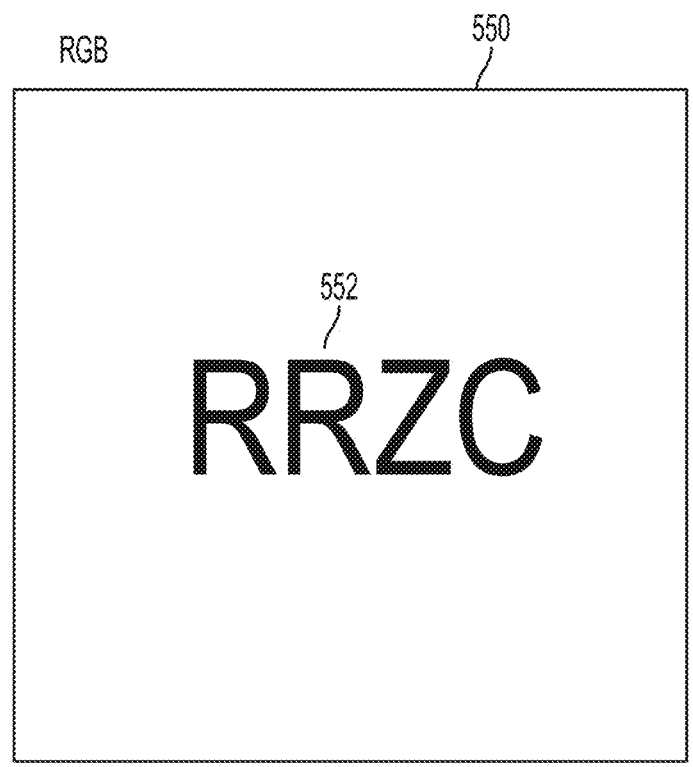
FIG. 5B illustrates example images, representing a text string, being stored in color channels of an image file, in accordance with some embodiments of the technology described herein.
Figure 5C:
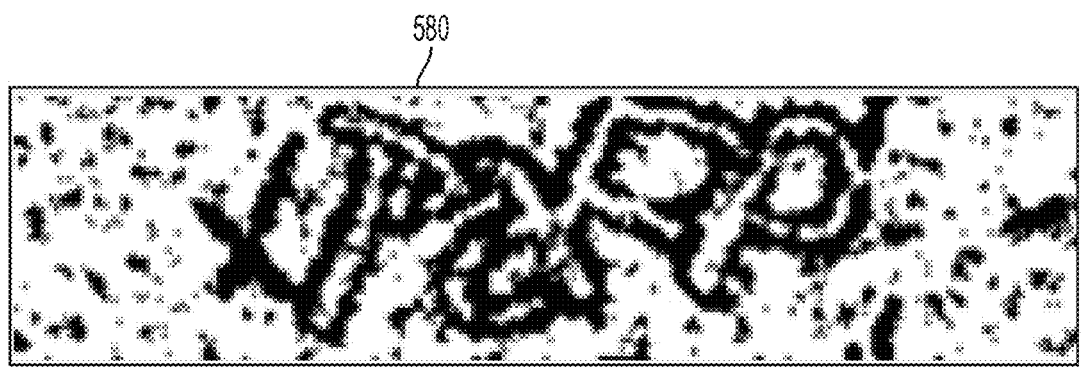
FIG. 5C illustrates another example image, representing another text string (different from that shown in FIG. 5B), which may be generated using decoding information being stored in a transparency channel of an image file, in accordance with some embodiments of the technology described herein.

For example, decoding information representing the challenge text "PARP" may be stored in the alpha channel 510 of the multi-channel image shown in FIG. 5A. A different image containing fake challenge text "RRZC" may be stored in the color channels 520, 530, and 540 of this multi-channel image. Thus, when the multi-channel image of FIG. 5A is displayed against a white background (where transparency does not matter), the image 550 containing the fake challenge text "RRZC" 552 is displayed, as shown in FIG. 5B. On the other hand, the metadata stored in the alpha channel of the multi-channel image may be extracted and used to display the actual challenge text "PARP" as shown in display 580 of FIG. 5C. The resolution of the displayed challenge text may be lower than that of the fake challenge text since the number of channels used to store data representing the fake challenge text (e.g., three channels) is greater than the number of channels (e.g., one) used to store data representing the challenge text.

As may be appreciated from the foregoing example, the multi-channel image may store data representing two different challenge texts: data representing the challenge text may be stored in its transparency channel and data representing the fake challenge text may be stored in the other channel(s). As discussed above, this feature may be useful for identifying malicious attempts to solve the CAPTCHA challenge. For example, a software bot may not know that the true challenge text is concealed in the transparency channel of the image and may extract and send the fake challenge text to a system that it is attempting to access. When the system detects that the fake challenge text has been sent back, it may deny the requesting device access. It should be appreciated, however, that the multi-channel image need not store an image with fake challenge text in its color channel(s) and may store any other suitable image therein including, for example, an image without any text in it whatsoever.

Next, at act 260, the image generated at act 255 is transmitted to the requesting device. The system executing process 250 may additionally send software code to the requesting device that, when executed by the requesting device (e.g., an Internet browser or other application program executing on the requesting device), may access the data stored in the transparency channel of the multi-channel image and use the accessed data to generate an image of the challenge text to show to a user of the requesting device. The software may be transmitted in any of the ways described herein and may be of any suitable type, examples of which are provided herein.

After transmitting a CAPTCHA challenge to the requesting device at act 260, the system performing process 250 may receive a response communication from the requesting device at act 262. The communication may include a response text purporting to be the solution to the CAPTCHA challenge. For example, the response text may be the text input by a human user of the requesting device in response to being presented, by the requesting device, with an image of the challenge text. In some embodiments, the communication may further include a token associated with the CAPTCHA challenge. The token may comprise a time stamp (e.g., a time stamp indicating a time at which the response was generated) and/or a security key specific to the challenge text. The system may use the token to verify that the response to the CAPTCHA challenge is a response to the transmitted CAPTCHA challenge (as opposed to some other CAPTCHA challenge) and that it was generated within a threshold time of the CAPTCHA challenge being sent to the requesting device.

Next, at act 264, the response text is identified from the communication received at act 262. The response text may be compared to the challenge text to determine whether the response text matches the challenge text. In some embodiments, when the response text matches the challenge text exactly, the system executing process 250 may grant the requesting device access to the requested web resource and deny access when the response text does not match the challenge text exactly. In other embodiments, an exact match is not required and a threshold number of errors may be specified. For example, when the number of errors between the response text and the challenge text is below the threshold number of errors (e.g., one error, two errors, or three errors), the system executing process 250 may allow the requesting device to access to the requested web resource and deny access when the number of errors between the response text and the challenge text is greater than (or greater than or equal to) the threshold number of errors.

Figure 3:
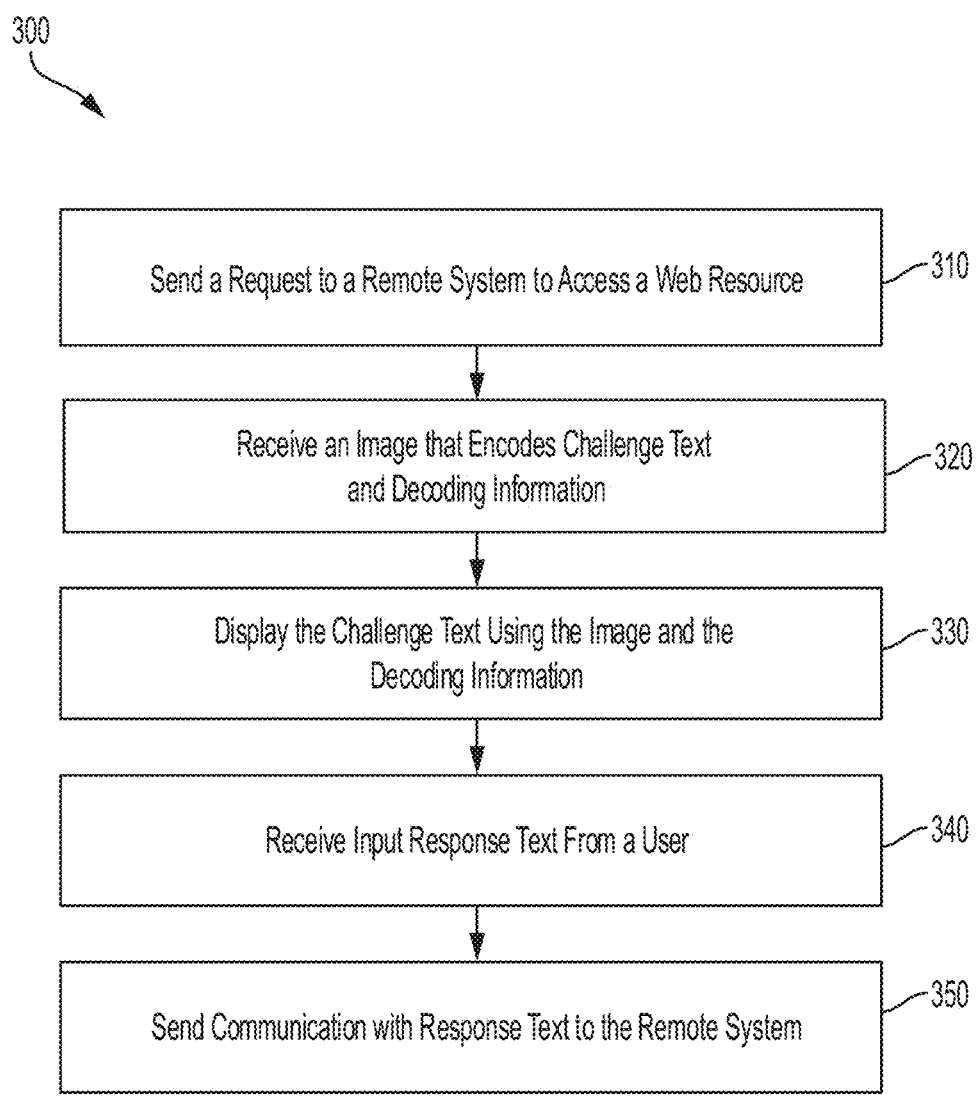
FIG. 3 is a flowchart of an illustrative process, performed by a device, for accessing a web resource, in accordance with some embodiments of the technology described herein.

FIG. 3 is a flowchart of an illustrative process 300 for accessing a web resource, in accordance with some embodiments of the technology described herein. The process 300 may be performed by any suitable system and/or computing device(s) and, for example, may be performed by client device 120 described with reference to FIG. 1.

Process 300 begins at act 310, where the device executing process 300 (e.g., client device 120) sends, to a remote system (e.g., system 110, server 114), a communication including a request to access a web resource. In some embodiments, the communication may be generated by an application program (e.g., an Internet browser) and/or an operating system executing on the device. For example, the communication may be generated by the Internet browser executing on the requesting device in response to a user clicking on a link in a webpage being displayed by the Internet browser or in response to any other suitable trigger. Examples of web resources are provided herein. The communication may conform to any suitable communications protocol and may be in any suitable format, as aspects of the technology described herein are not limited in this respect.

Next, at act 320, the device receives, from the remote system, an image encoding a challenge text and decoding information. In some embodiments, the image may be a shuffled image generated using the techniques described herein including with reference to FIG. 2A. In other embodiments, the image may be an image storing decoding information in its transparency channel and generated using the techniques described herein including with reference to FIG. 2B. In addition, the device may receive, from the remote system, software code that, when executed by the device (e.g., by an application program executing on the device such as, for example, an Internet browser) uses the decoding information to reveal the challenge text from the image.

Next, at act 330, the device may display the challenge text to a user. This may be done in any suitable way. For example, in some embodiments, the received image may have been generated by re-arranging portions of an initial image that represents a challenge text. In such embodiments, an application program may use the decoding information to re-arrange portions of the received image to obtain the initial image and display the initial image to a user of the device. For example, an Internet browser may execute software code received at act 320 and the software code may generate the initial image by re-arranging portions of the received image using the decoding information. As another example, in some embodiments, the received image may include data representing the challenge text in its transparency channel. In such embodiments, an application program may access the data representing the challenge text in the transparency channel of the received image, generate an image based on these data, and display the generated image to the user. For example, an Internet browser may execute software code received at act 320 and the software code may access the data in the transparency channel of the received image and use these data display the challenge text to the user.

After presenting the challenge text to a user, at act 330, the device receives input text from a user at act 340. The text may represent the user's attempt to input the challenge text. The user may enter the input text using a keyboard (physical or virtual), a mouse, by dictation (and the device may convert the user's dictated response to text by using automated speech recognition), or in any other suitable way.

Next, at act 350, the device sends a communication including a representation of the input text to the remote system. This may be done in any suitable way. In some embodiments, the device may send the communication in response to a user indication to do so. For example, the device may send the communication to the remote system in response to a user clicking on a button on a webpage (e.g., the webpage on which the challenge text is presented to the user) indicating that the input text is to be submitted. In some embodiments, the communication transmitted by the device to the remote system may further comprise additional information that may be used by the remote system to validate the response. For example, the additional information may comprise a timestamp associated with the response or a security token associated with the challenge text.

As discussed above, the remote system may grant the device access to the requested web resource based on a comparison between the input text (representing the user's solution to the CAPTCHA challenge) and the challenge text. When the remote system determines, based on the comparison, that the device may access the requested web resource, the remote system may send the device an indication that it may access the web resource and/or provide the web resource directly. For example, the Internet browser executing on the device may be permitted to access a requested webpage, perform a requested action on a website (e.g., an action in furtherance of a transaction, such as a financial transaction), and/or download content. On the other hand, when the remote system determines, based on the comparison, that the device may not access the requested web resource, the remote system may send the device an indication that access is denied. In some instances, the remote system may send another CAPTCHA challenge to the device to give the user another opportunity to gain access.

In the embodiments described with reference to FIGS. 2A-2B, 3, 4A-E, and 5A-5E, CAPTCHA challenges were encoded in images (e.g., in a transparency channel of an image or as shuffled arrangement of image portions). However, in other embodiments, a CAPTCHA challenge may be provided to a device (e.g., client device 120) without sending any image encoding the challenge text to the device. For example, in some embodiments, software code embodying a CAPTCHA challenge may be provided to the device. The software code, when executed by the device (e.g., by an application program, for example an Internet browser, executing on the device), may display and/or manipulate graphical elements on a webpage to change their appearance such that the challenge text is displayed on the webpage. As a specific non-limiting example, the software code, when executed by an Internet browser on the device, may cause a plurality of graphical elements to be displayed at a set of locations in a webpage and set the color of the graphical elements to black so that the graphical elements appear black against a white background of the webpage. The webpage locations may be set based on a challenge text so that when the color of the graphical elements is set to black, the graphical elements form a visual representation of the challenge text. In some embodiments, the graphical elements may be created, displayed, and/or manipulated using Hyper Text Markup Language (HTML), Cascading Style Sheets (CSS), and/or OpenGL. In some embodiments, the graphical elements may comprise HTML span elements, HTML canvas elements, and/or OpenGL elements.

Figure 6:
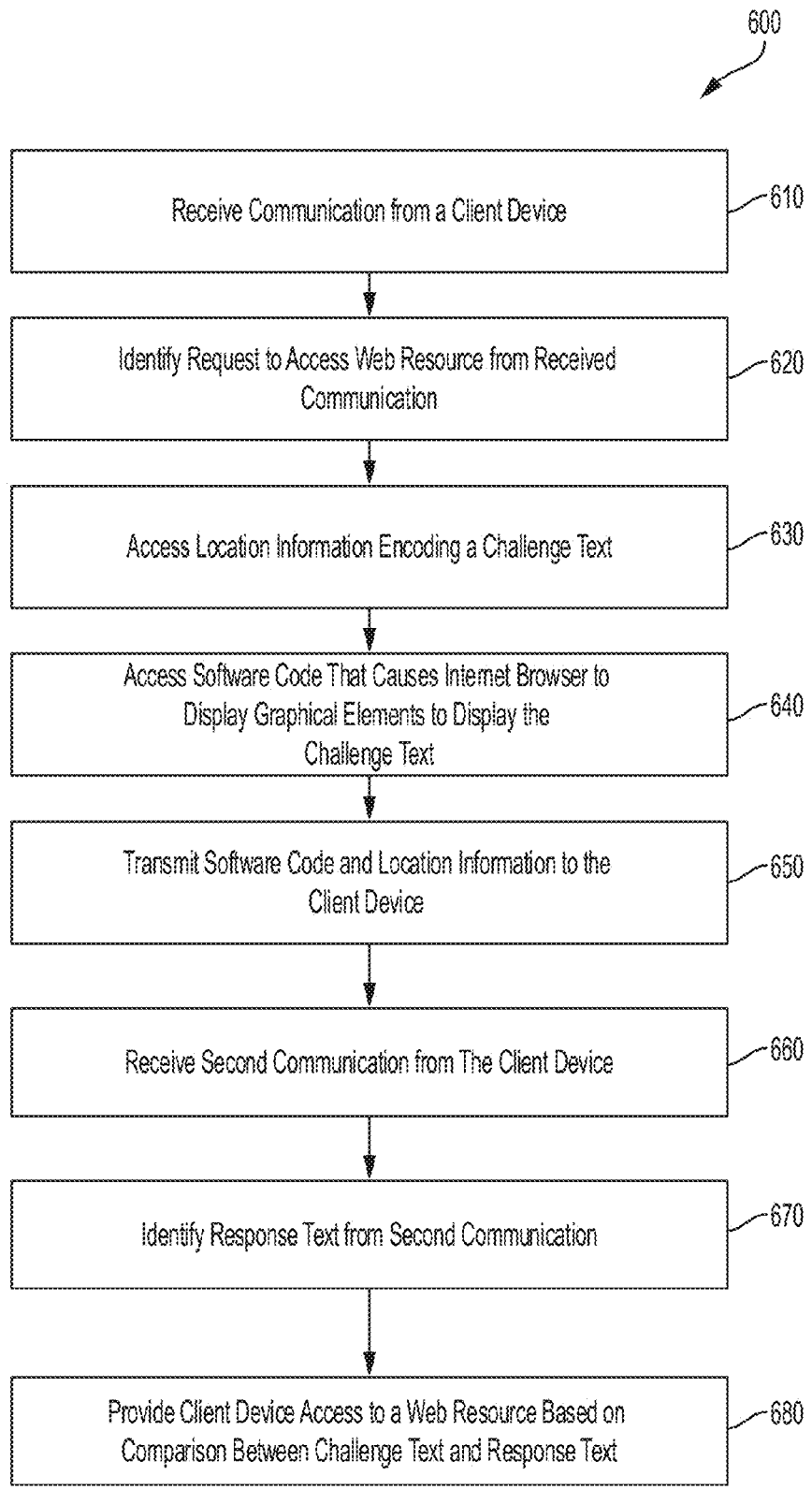
FIG. 6 is a flowchart of another illustrative process, performed by at least one server, for determining whether a device may access a web resource, in accordance with some embodiments of the technology described herein.

FIG. 6 is a flowchart of an illustrative process 600 for determining whether a device may access a web resource, in accordance with some embodiments of the technology described herein. The process 600 may be performed by any suitable system and/or computing device and, for example, may be performed by system 110 described with reference to FIG. 1.

Process 600 begins at act 610, where the system executing process 600 receives a communication from a requesting device (e.g., client device 120 described with reference to FIG. 1). In some embodiments, the communication may be generated by an application program and/or an operating system executing on the requesting device. For example, the communication may be generated by an Internet browser of any suitable type. In some embodiments, the communication may be generated by the Internet browser executing on the requesting device in response to a user clicking on a link in a webpage being displayed by the Internet browser or in response to any other suitable trigger. The communication may include a request to access a web resource. Examples of web resources are provided herein. The communication may conform to any suitable communications protocol and may be in any suitable format, as aspects of the technology described herein are not limited in this respect.

Next, process 600 proceeds to act 620, where the system executing process 600 identifies, from the communication, a request to access a web resource. In some embodiments, the system may analyze the communication received at act 610 and detect that the user has requested to access a specific web resource. For example, the communication may comprise information associated with an object that a user has selected on a website. The object may be a uniform resource locator (URL). Based on the selected URL, the system may identify a request to access a particular web resource. However, it should be appreciated, that a request to access a web resource may be identified from the communication in any other suitable way, as aspects of the technology described herein are not limited in this respect.

Next, process 600 proceeds to acts 630, 640, and 650, where the system executing process 600 generates a CAPTCHA challenge and transmits the generated CAPTCHA challenge to the requesting device. At act 630, the system accesses location information that encodes a challenge text. In some embodiments, the location information may specify a plurality of locations (e.g., coordinates) on a webpage. The plurality of locations may encode the challenge text so that, when graphical elements having one visual appearance (e.g., a particular color or a particular type of shading) are displayed at the plurality of locations and the background of the webpage has a different visual appearance (e.g., another color or another type of shading), the webpage may display the challenge text when the graphical elements are displayed in it. In some embodiments, the plurality of locations may specify the pixel locations of the letters in the challenge text. For example, each of the plurality of locations may specify the location of a single pixel or a group of pixels. The location information may specify the plurality of locations in any suitable way (e.g., using one or more numerical values, using code instructions, a configuration file, etc.) and in any suitable format, as aspects of the technology described herein are not limited in this respect.

Figure 7A:
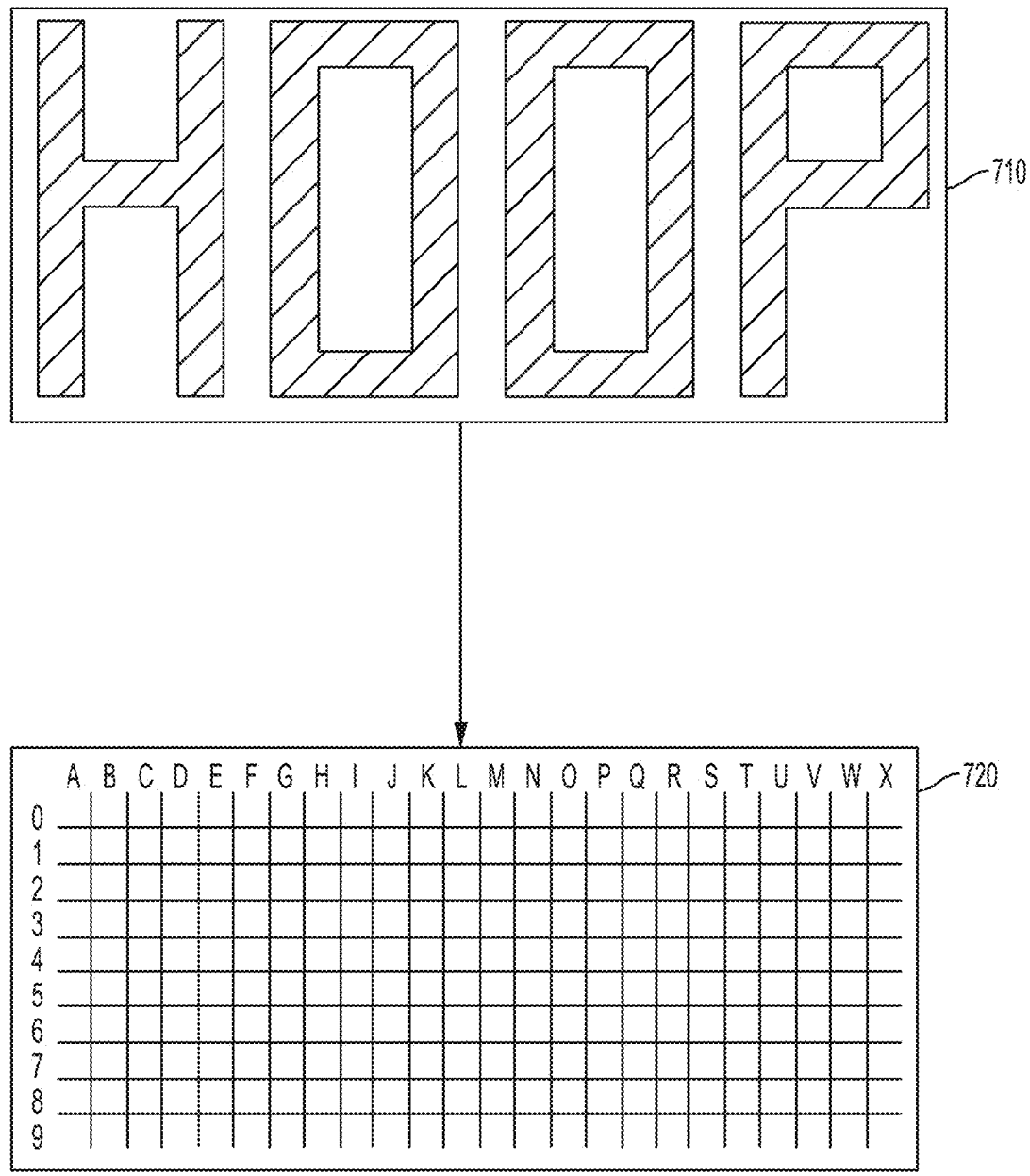
FIG. 7A illustrates a challenge text to be encoded using graphical elements of a webpage, in accordance with some embodiments of the technology described herein.

An illustrative example is provided in FIGS. 7A-7D. As shown in FIG. 7A, webpage 720 may be represented as a grid of cells. The grid of cells may include any suitable number of cells and each grid cell may be of any suitable size. Each grid cell may represent a single pixel or a group of pixels. In this example, location information may encode a challenge text by specifying locations of grid cells in which to place graphical elements having a particular visual appearance (e.g., having a particular color or having particular shading). So long as this particular visual appearance differs from the background of the webpage, the collection of graphical elements at these locations may provide a visual representation of the text.

Figure 7D:
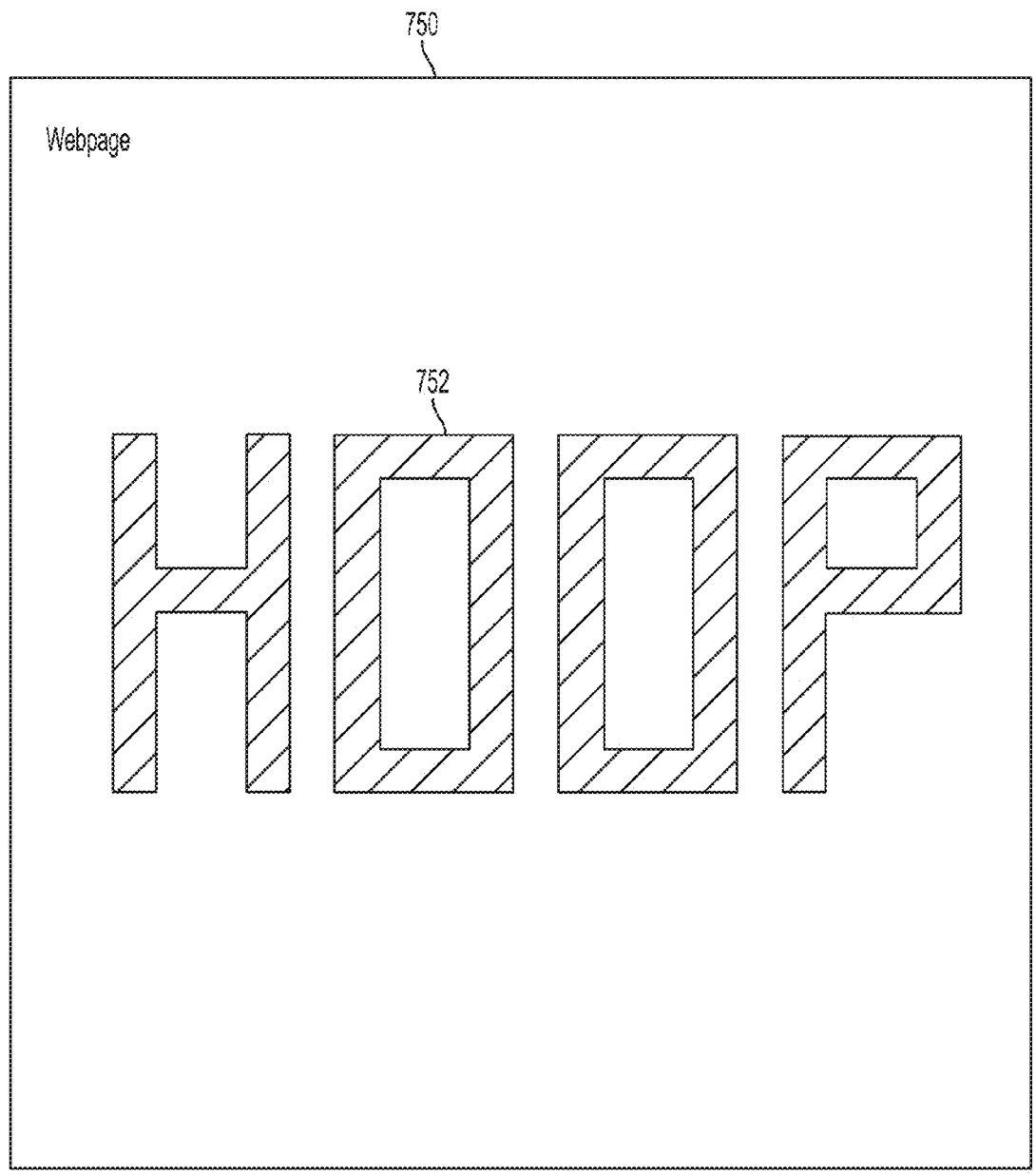
FIG. 7D illustrates a webpage showing the challenge text of FIG. 7A, in accordance with some embodiments of the technology described herein.

For example, the challenge text "HOOP" 710 may be represented by the location information 730 shown in FIG. 7B. Location information 730 specifies the grid cells at which to place graphical elements having a different visual appearance from the background of the webpage. For example, as shown in FIG. 7C, graphical elements having diagonal shading may be placed at the locations of the grid cells identified in location information 730. As a result, the appearance of the webpage at the grid cells identified in location 730 is changed relative to the background of the webpage. Accordingly, in this example, once the webpage is displayed with the graphical elements at the locations of the grid cells, the resulting webpage 750 displays the challenge text "HOOP" 752, as shown in FIG. 7D.

At act 640, the system performing process 600 accesses software code that, when executed by the requesting device (e.g., by an Internet browser executing on the requesting device), causes a plurality of graphical elements to be displayed at the plurality of locations specified by the location information accessed at act 630. In some embodiments, when the software code is executed, the software code may: (1) cause a plurality of HTML elements to be displayed at the plurality of locations (e.g., a plurality of HTML span elements or a plurality of HTML canvas elements) in a webpage; and (2) set the visual appearance of the plurality of HTML elements to be different from the visual appearance of one or more portions of the webpage (e.g., the background of the webpage) so that, when the webpage containing the graphical elements at the plurality of locations is displayed, the webpage displays the challenge text.

Next, at act 650, the location information accessed at act 630 and the software code accessed at act 640 are transmitted to the requesting device. In some embodiments, the software code and the location information may be sent to the requesting device as part of a webpage. In such embodiments, the system executing process 600 may generate a webpage including the software code (e.g., as JAVASCRIPT code) and the location information. One illustrative example of such a webpage is webpage 800 shown in FIG. 8. Webpage 800 includes a canvas element 830 that specifies the location of the overall CAPTCHA challenge in the webpage 800. Additionally, webpage 800 includes JAVASCRIPT software code appearing between the <script> and </script> tags. The software code includes location information 810 specifying a plurality of locations and program logic 820 including one or more instructions to cause the Internet browser to display a plurality of graphical elements at the plurality of locations specified by location information 810. In this example, program logic 820 includes a JAVASCRIPT function call to JAVASCRIPT code that may be provided with or separate from the webpage. It should be appreciated, however, that in some embodiments, the software code and the location information may be provided to the requesting device separately from a webpage, as aspects of the technology described herein are not limited in this respect.

After transmitting a CAPTCHA challenge to the requesting device at act 650, the system performing process 600 may receive a response communication from the requesting device at act 660. The communication may include a response text purporting to be the solution to the CAPTCHA challenge. For example, the response text may be the text input by a human user of the requesting device in response to being presented, by the requesting device, with an image of the challenge text. In some embodiments, the communication may further include a token associated with the CAPTCHA challenge. The token may comprise a time stamp (e.g., a time stamp indicating a time at which the response was generated) and/or a security key specific to the challenge text. The system may use the token to verify that the response to the CAPTCHA challenge is a response to the transmitted CAPTCHA challenge (as opposed to some other CAPTCHA challenge) and that it was generated within a threshold time of the CAPTCHA challenge being sent to the requesting device.

Next, at act 670, the response text is identified from the communication received at act 660. The response text may be compared to the challenge text to determine whether the response text matches the challenge text. In some embodiments, when the response text matches the challenge text exactly, the system executing process 600 may allow the requesting device to access the requested web resource and deny access when the response text does not match the challenge text exactly. In other embodiments, an exact match is not required and a threshold number of errors may be specified. For example, when the number of errors between the response text and the challenge text is below the threshold number of errors (e.g., one error, two errors, or three errors), the system executing process 600 may grant the requesting device access to the requested web resource and deny access when the number of errors between the response text and the challenge text is greater than (or greater than or equal to) the threshold number of errors. Errors between the response text and the challenge text may be of any suitable type. For example, an error between the response text and the challenge text may occur when there is a character in the challenge text that is missing in the response text, when the response text includes a character not in the challenge text, and/or when the response text includes a character at a position that is different from the character at the same position in the challenge text.

It should be appreciated that process 600 is illustrative and that there are variations. For example, although in the illustrated embodiment of FIG. 6, the location information specifying a challenge text is accessed at act 630, in other embodiments, the location information specifying the challenge text may instead be generated as part of act 630. This may be done in any suitable way. For example, the challenge text and its appearance (e.g., font, size, color, etc.) may be selected and the location information may be derived from the challenge text (e.g., by representing the challenge text as a grid of pixels and including in the location information the locations of the pixels that are within the challenge text). As another example, although in the illustrated embodiment of FIG. 6 the software code is accessed at act 640, in other embodiments, the software code may be generated dynamically during the performance of process 600.

Also, in some embodiments, the software code and the location information may be sent to the requesting device separately from one another. In other embodiments, the software code may include the location information as one or more parameters and/or any suitable type of configuration data (e.g., as shown in the illustrative example of FIG. 8). In yet other embodiments, the software code may be configured to generate the location information dynamically by executing one or more program instructions to do so.

In some embodiments, the software code may be configured to vary over time the plurality of locations specified by the location information. In this way, the locations of the plurality of graphical elements within the webpage may vary over time (e.g., periodically so as to create a looping effect or aperiodically to create an effect of natural, non-repetitive movement). Additionally or alternatively, the visual appearance of the graphical elements at the plurality of locations may vary over time. As a result, the location and/or the visual appearance of the graphical elements (which are used to provide a visual representation of challenge text) may vary over time in the webpage. In this way, the content, appearance, and/or location of the challenge text in the webpage may be varied over time.

For example, in some embodiments, the software code, when executed by an Internet browser, may cause the webpage to initially display a first text different from the challenge text and subsequently display the challenge text after a threshold amount of time. For example, as shown in FIG. 9A, the software code may vary the content of the challenge text with respect to time. As shown in FIG. 9A, an Internet browser executing the software code may initially display fake challenge text "HOOP" 912 in webpage 910 and then, at a later time (e.g., three seconds later), may display the true challenge text "LOST" 922. The delayed reveal of the true challenge text may help to thwart attempts by software bots to solve the CAPTCHA challenge. For example, a software bot may not know that the true challenge text is not the text displayed first and may expend considerable computational resources (e.g., by launching an instance of an Internet browser) to automatically identify the text in the fake challenge (e.g., the text "HOOP"). However, when the system detects that a requesting device sends back the fake challenge text, the system may deny that device access to the requested resource. Even if a software bot were programmed to wait until the true challenge text is revealed, the additional delay makes it more resource intensive and difficult to launch a high volume of automated attacks.

Figure 9B:
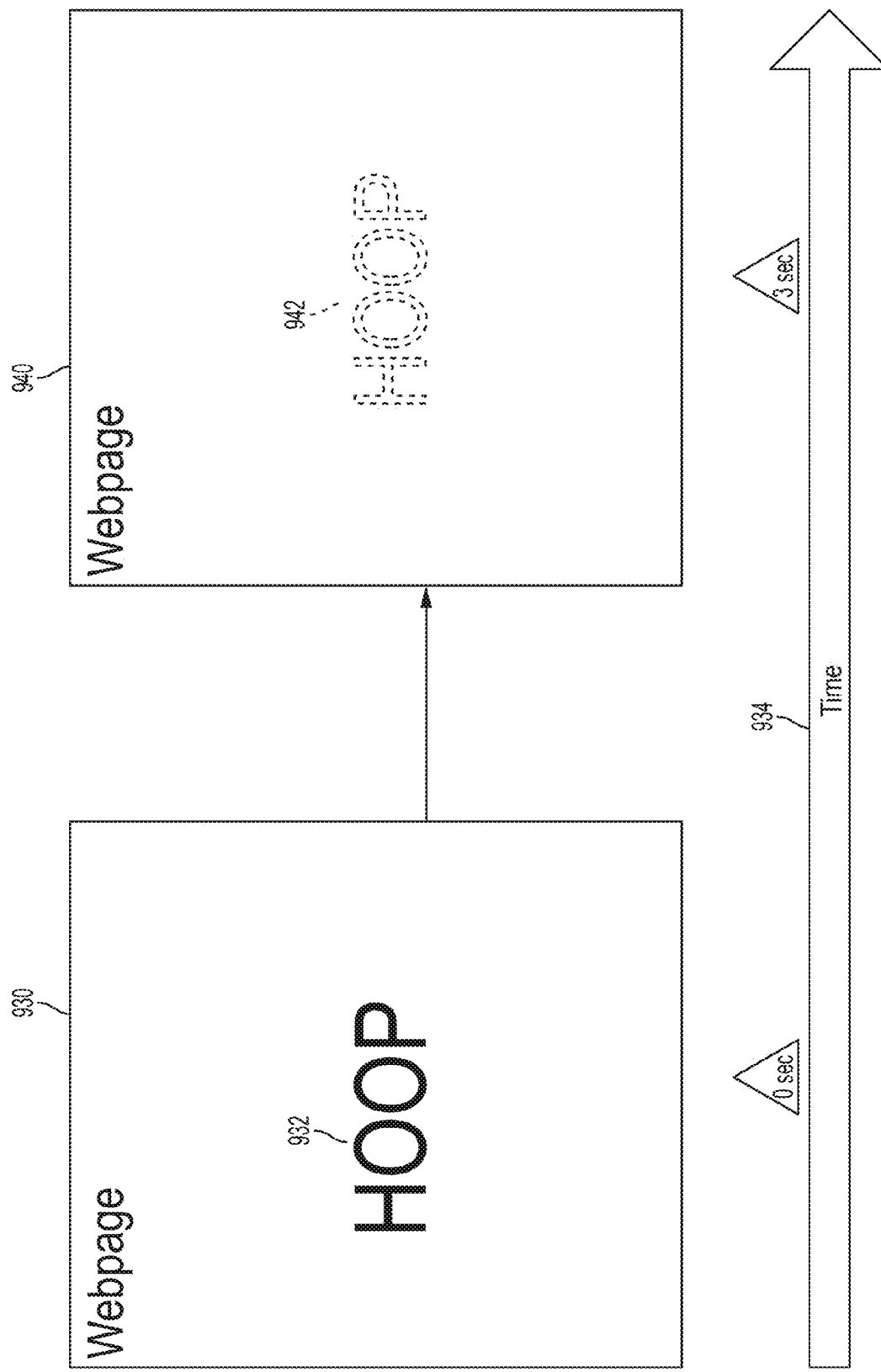
FIG. 9B illustrates changing color of the challenge text over time, in accordance, with some embodiments of the technology described herein.

As another example, in some embodiments, the software code, when executed by an Internet browser, may cause the visual appearance of the challenge text to vary over time. For example, as shown in FIG. 9B, the software code may vary the visual appearance of the challenge text with respect to time. As shown in FIG. 9B, an Internet browser executing the software code may initially display the challenge text "HOOP" 932 in webpage 930 using one type of shading (and/or color) and then, at a later time, may display the same challenge text using another type of shading (and/or color), as shown by challenge text "HOOP" 942. This may be done in any suitable way. For example, in some embodiments, the software code may include program instructions to modify visual characteristics of graphical elements over time. For example, the software code may include JAVASCRIPT functions configured to set a CSS color property of an HTML span or canvas element at one time and then change the CSS color property at another time. Changing the visual appearance (e.g., color, size, transparency, shading, etc.) of the challenge text may make it more difficult for automated software bots to identify the challenge text.

Figure 9C:
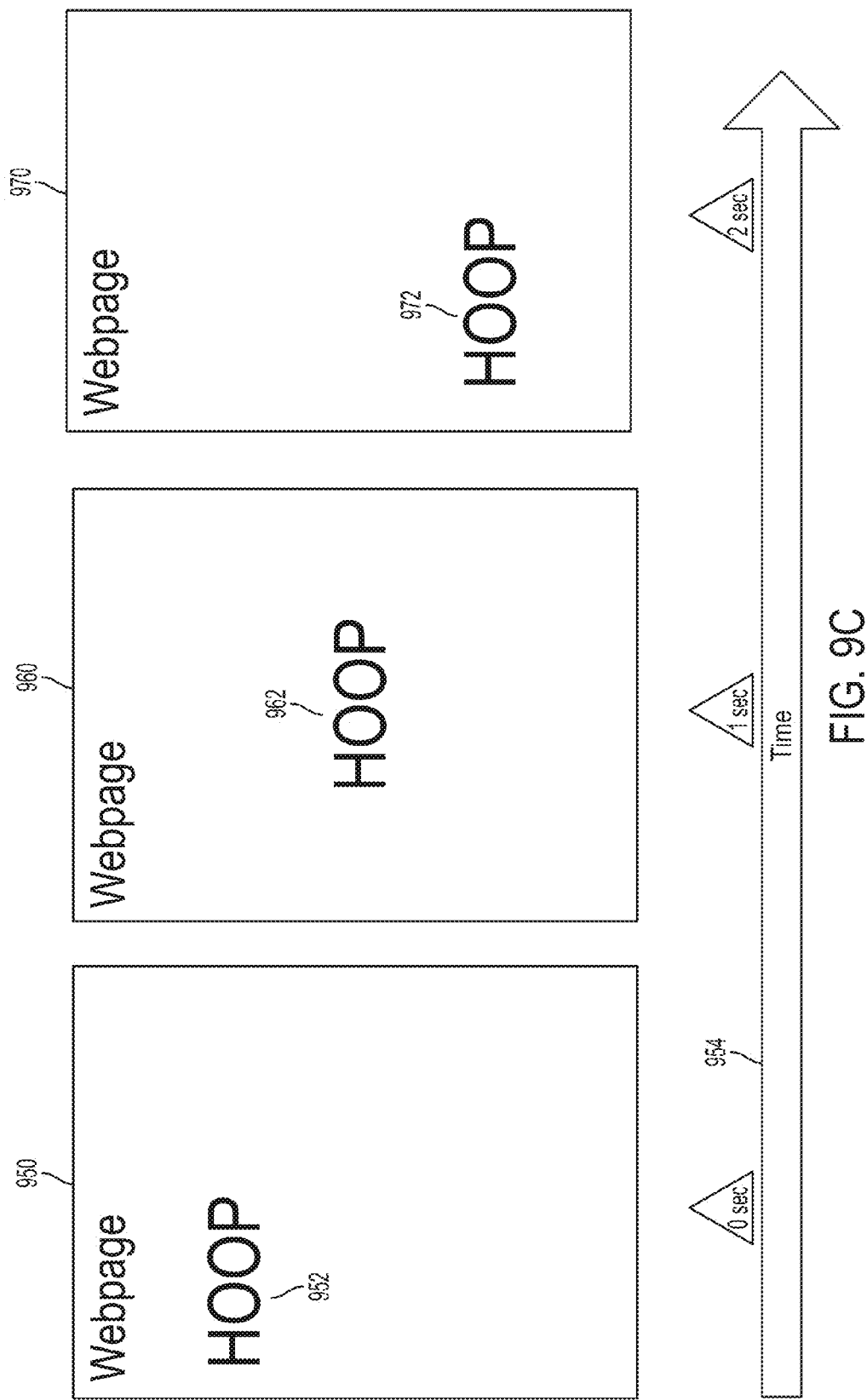
FIG. 9C illustrates changing location of the challenge text over time, in accordance with some embodiments of the technology described herein.

As yet another example, in some embodiments, the software code, when executed by an Internet browser, may change the location of where the challenge text is displayed in the webpage. For example, as shown in FIG. 9C, the software code may vary the location of the challenge text in the webpage with respect to time. As shown in FIG. 9C, the challenge text in webpage 950 is initially displayed at location 952, then at location 962, and finally at location 972. In some embodiments, the movement of the challenge text may be periodic or looping. In other embodiments, the movement of the challenge text may be aperiodic and may not have any discernible repetitive pattern of movement. Such aperiodic movement makes it more difficult for a software bot to solve the CAPTCHA challenge, whereas a software bot may be able to predict periodic movement of a challenge text and take advantage of such looping to increase the likelihood of correctly solving the CAPTCHA challenge.

Figure 10:
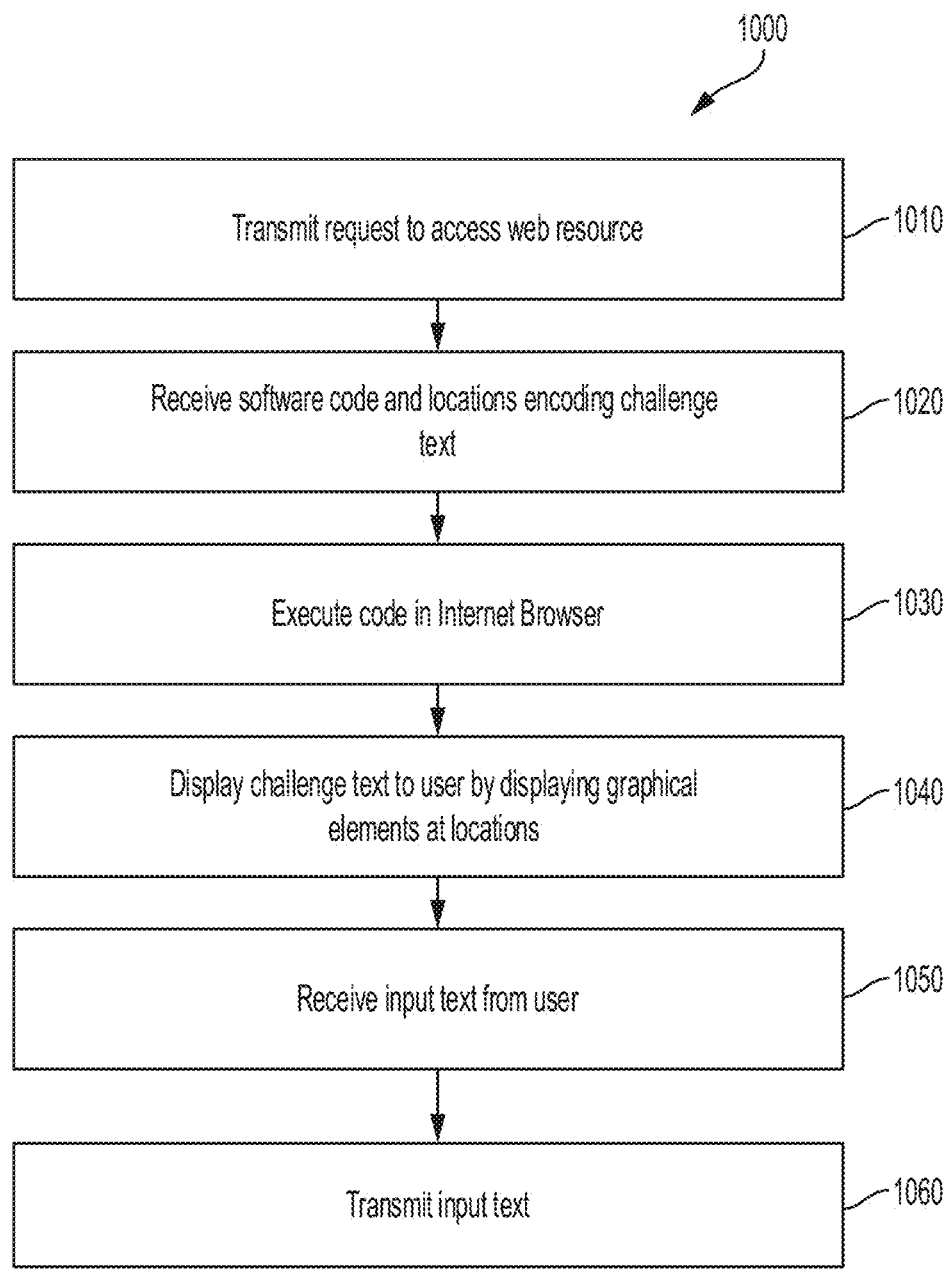
FIG. 10 is a flowchart of another illustrative process, performed by a device, for accessing a web resource, in accordance with some embodiments of the technology described herein.

FIG. 10 is a flowchart of an illustrative process 1000 for accessing a web resource, in accordance with some embodiments of the technology described herein. The process 1000 may be performed by any suitable system and/or computing device(s) and, for example, may be performed by client device 120 described with reference to FIG. 1.

Process 1000 begins at act 1010, where the device executing process 1000 (e.g., client device 120) sends, to a remote system (e.g., system 110, server 114), a communication including a request to access a web resource. In some embodiments, the communication may be generated by an application program (e.g., an Internet browser) and/or an operating system executing on the device. For example, the communication may be generated by the Internet browser executing on the requesting device in response to a user clicking on a link in a webpage being displayed by the Internet browser or in response to any other suitable trigger. Examples of web resources are provided herein. The communication may conform to any suitable communications protocol and may be in any suitable format, as aspects of the technology described herein are not limited in this respect.

Next, at act 1020, the device receives, from the remote system, location information specifying a plurality of locations and representing the challenge text. The device also receives software code that, when executed by the device (e.g., by an application program executing on the device such as, for example, an Internet browser), causes a plurality of graphical elements to be displayed at the plurality of locations in a webpage, and sets the visual appearance of the graphical elements so that they are visible in the webpage (e.g., by setting one or more of their visual characteristics to be different from that of the webpage) thereby causing the challenge text to be displayed in the webpage. In some embodiments, the software code may be a script (e.g., written in JAVASCRIPT) or application program (e.g., a Java applet), and/or any other suitable type of software code written in any suitable scripting and/or programming language.

Next, at act 1030, the device may display the challenge text to a user. This may be done in any suitable way. For example, an application program (e.g., an Internet browser) executing on the device may use the software code and the location information specifying a plurality of locations received at act 1020 to: (1) display a plurality of graphical elements at the plurality of locations in a webpage; (2) set the visual appearance of the graphical elements to be different from that of (e.g., the background of) the webpage; and (3) display the webpage to the user thereby showing the user the challenge text. As discussed above, in some embodiments, the software code may vary the content, appearance, and/or location of the challenge text in the webpage. In some embodiments, the software code may present a fake challenge text to a user and, after a threshold amount of time, replace the fake challenge text with the text of the actual challenge.

After presenting the challenge text to a user, at act 1040, the device receives input text from the user. The text may represent the user's attempt to type in the challenge text. The user may enter the input text using a keyboard (physical or virtual), a mouse, by dictation (and the device may convert the user's dictated response to text by using automated speech recognition), or in any other suitable way.

Next, at act 1050, the device sends a communication including the input text to the remote system. This may be done in any suitable way. In some embodiments, the device may send the communication in response to a user indication to do so. For example, the device may send the communication to the remote system in response to a user clicking on a button on a webpage (e.g., the webpage on which the challenge text is presented to the user) indicating that the input text is to be submitted. In some embodiments, the communication transmitted by the device to the remote system may further comprise additional information that may be used by the remote system to validate the response. For example, the additional information may comprise a timestamp associated with the response or a security token associated with the challenge text.

As discussed above, the remote system may grant the device access to the requested web resource based on a comparison between the input text (representing the user's solution to the CAPTCHA challenge) and the challenge text. When the remote system determines, based on the comparison, that the device may access the requested web resource, the remote system may send the device an indication that it may access the web resource and/or provide the web resource directly. For example, the Internet browser executing on the device may be permitted to access a requested webpage, perform a requested action on a website (e.g., an action in furtherance of a transaction, such as a financial transaction), and/or download content. On the other hand, when the remote system determines, based on the comparison, that the device may not access the requested web resource, the remote system may send the device an indication that access is denied. In some instances, the remote system may send another CAPTCHA challenge to the device to give the user another opportunity to gain access.

It should be appreciated that process 1000 is illustrative and that there are variations. For example, in some embodiments, at act 1020, the device performing process 1000 may receive the location information separately from software code that generates a plurality of graphical elements at the locations specified by the location information. In other embodiments, the software code may include the location information as one or more parameters, one or more variables, and/or any suitable type configuration data. In yet other embodiments, the software code may be configured to generate the location information dynamically by executing one or more program instructions to do so.

It should further be appreciated that aspects of the features and technologies described above are not limited to only the described functionalities. One or more embodiments discussed herein may be combined. The figures are illustrations of example embodiments. It is appreciated that several variations of the illustrated example embodiments are possible.

Figure 11:
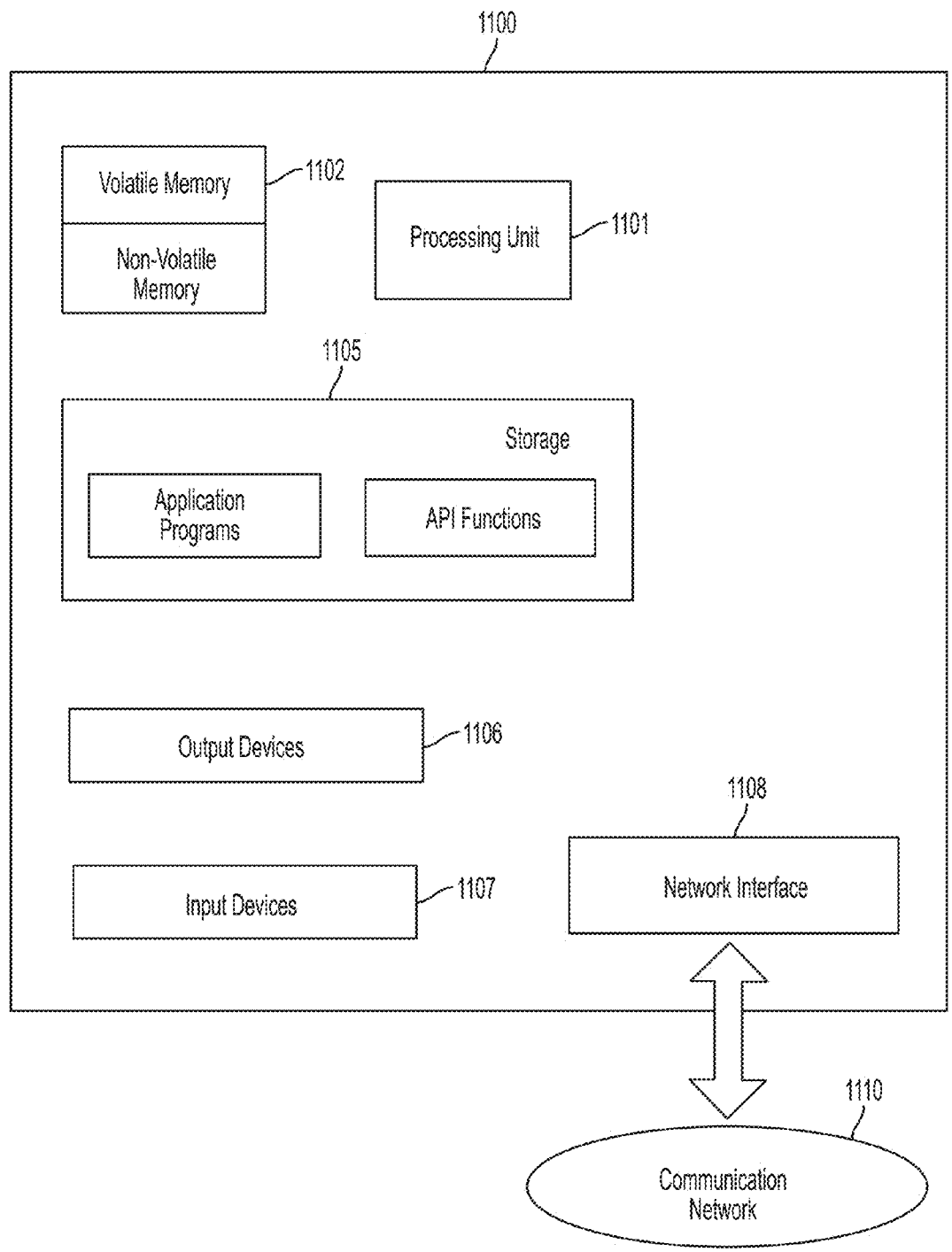
FIG. 11 shows, schematically, an illustrative computer 1100 on which any aspect of the technology described herein may be implemented.

In the embodiment shown in FIG. 11, the computer 1100 includes a processing unit 1101 having one or more processors and a non-transitory computer-readable storage medium 1102 that may include, for example, volatile and/or non-volatile memory. The memory 1102 may store one or more instructions to program the processing unit 1101 to perform any of the functions described herein. The computer 1100 may also include other types of non-transitory computer-readable medium, such as storage 1105 (e.g., one or more disk drives) in addition to the system memory 1102. The storage 1105 may also store one or more application programs and/or resources used by application programs (e.g., software libraries), which may be loaded into the memory 1102.

The computer 1100 may have one or more input devices and/or output devices, such as output device(s) 1106 and input device(s) 1107 illustrated in FIG. 11. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input device(s) 1107 may include a microphone for capturing audio signals, and the output device(s) 1106 may include a display screen for displaying, and/or a speaker for audibly rendering, recognized text.

As shown in FIG. 11, the computer 1100 may also comprise one or more network interfaces (e.g., the network interface 1108) to enable communication via various networks (e.g., the network 1110). Examples of networks include a local area network or a wide area network, such as an enterprise network or the Internet. Such networks may be based on any suitable technology and may operate according to any suitable protocol and may include wireless networks, wired networks, and/or fiber optic networks.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A system, comprising:
   at least one computer; and
   at least one non-transitory computer-readable storage medium storing processor-executable instructions that, when executed by the at least one computer, cause the at least one computer to perform:
   receiving, via at least one network, a first communication from a device different from the at least one computer;
   identifying, from the first communication, a request to access a web resource;
   generating an image comprising pixel values in a plurality of channels including a transparency channel, the generating comprising encoding a challenge text in the image at least in part by:
   generating decoding information for displaying the challenge text, the decoding information including a plurality of saturation values for a respective plurality of pixels in the image; and storing the decoding information, including the plurality of saturation values, in the transparency channel of the image;

transmitting, to the device and via the at least one network, the generated image and software code that, when executed by the device, uses the decoding information to facilitate displaying of the challenge text by the device;

receiving, via the at least one network, a second communication from the device;

identifying, from the second communication, a response text; and providing the device with access to the web resource based on a comparison between the challenge text and the response text.

2. The system of claim 1, wherein the software code comprises JAVASCRIPT software code for execution by an Internet browser executing on the device.

3. The system of claim 1, wherein the software code, when executed by an Internet browser, uses the decoding information to cause a plurality of graphical elements to be displayed in a webpage so that the webpage displays the challenge text.

4. The system of claim 3, wherein the plurality of graphical elements includes one or more HTML elements and/or one or more OpenGL elements.

5. The system of claim 3, wherein the software code includes OpenGL instructions, and wherein the software code, when executed by the Internet browser, causes the plurality of graphical elements to be displayed by using at least one graphical processing unit (GPU) to execute the OpenGL instructions to render the plurality of graphical elements.

6. The system of claim 1, wherein the image encodes other text that is displayed to a user when the image is displayed by the device against a white background, wherein the other text is different from the challenge text.

7. The system of claim 6, wherein the other text is encoded in data stored in at least one channel of the plurality of channels, the at least one channel not including the transparency channel.

8. The system of claim 1, wherein the software code, when executed by the device, uses the decoding information to generate graphical elements based on the plurality of saturation values in the decoding information.

9. The system of claim 8, wherein the software code, when executed by the device, uses the decoding information to generate an HTML element for a pixel and set the color of the HTML element based on a saturation value for the pixel specified in the decoding information.

10. A method, comprising:
receiving, via at least one network, a first communication from a device;
identifying, from the first communication, a request to access a web resource;
generating an image comprising pixel values in a plurality of channels including a transparency channel, the generating comprising encoding a challenge text in the image at least in part by:
generating decoding information for displaying the challenge text, the decoding information including a plurality of saturation values for a respective plurality of pixels in the image; and
storing the decoding information, including the plurality of saturation values, in the transparency channel of the image;
transmitting, to the device and via the at least one network, the generated image and software code that, when executed by the device, uses the decoding information to facilitate displaying of the challenge text by the device;
receiving, via the at least one network, a second communication from the device;
identifying, from the second communication, a response text; and
providing the device with access to the web resource based on a comparison between the challenge text and the response text.

11. The method of claim 10, wherein the software code comprises JAVASCRIPT software code for execution by an Internet browser executing on the device.

12. The method of claim 10, wherein the software code, when executed by an Internet browser, uses the decoding information to cause a plurality of graphical elements to be displayed in a webpage so that the webpage displays the challenge text.

13. The method of claim 12, wherein the plurality of graphical elements includes one or more HTML elements and/or one or more OpenGL elements.

14. The method of claim 12, wherein the software code includes OpenGL instructions, and wherein the software code, when executed by the Internet browser, causes the plurality of graphical elements to be displayed by using at least one graphical processing unit (GPU) to execute the OpenGL instructions to render the plurality of graphical elements.

15. The method of claim 10, wherein the image encodes other text that is displayed to a user when the image is displayed by the device against a white background, wherein the other text is different from the challenge text.

16. The method of claim 15, wherein the other text is encoded in data stored in at least one channel of the plurality of channels, the at least one channel not including the transparency channel.

17. The method of claim 10, wherein the software code, when executed by the device, uses the decoding information to generate graphical elements based on the plurality of saturation values in the decoding information.

18. The method of claim 17, wherein the software code, when executed by the device, uses the decoding information to generate an HTML element for a pixel and set the color of the HTML element based on a saturation value for the pixel specified in the decoding information.

19. At least one non-transitory computer-readable storage medium storing processor-executable instructions that, when executed by at least one computer, cause the at least one computer to perform:
receiving, via at least one network, a first communication from a device different from the at least one computer;
identifying, from the first communication, a request to access a web resource;
generating an image comprising pixel values in a plurality of channels including a transparency channel, the generating comprising encoding a challenge text in the image at least in part by:
generating decoding information for displaying the challenge text, the decoding information including a plurality of saturation values for a respective plurality of pixels in the image; and
storing the decoding information, including the plurality of saturation values, in the transparency channel of the image;

transmitting, to the device and via the at least one network, the generated image and software code that, when executed by the device, uses the decoding information to facilitate displaying of the challenge text by the device;

receiving, via the at least one network, a second communication from the device;

identifying, from the second communication, a response text; and providing the device with access to the web resource based on a comparison between the challenge text and the response text.

20. The at least one non-transitory computer readable storage medium of claim 19, wherein the software code comprises JAVASCRIPT software code for execution by an Internet browser executing on the device.

21. The at least one non-transitory computer readable storage medium of claim 19, wherein the software code, when executed by an Internet browser, uses the decoding information to cause a plurality of graphical elements to be displayed in a webpage so that the webpage displays the challenge text.

22. The at least one non-transitory computer readable storage medium of claim 21, wherein the plurality of graphical elements includes one or more HTML elements and/or one or more OpenGL elements.

23. The at least one non-transitory computer readable storage medium of claim 21, wherein the software code includes OpenGL instructions, and wherein the software code, when executed by the Internet browser, causes the plurality of graphical elements to be displayed by using at least one graphical processing unit (GPU) to execute the OpenGL instructions to render the plurality of graphical elements.

24. The at least one non-transitory computer readable storage medium of claim 19, wherein the image encodes other text that is displayed to a user when the image is displayed by the device against a white background, wherein the other text is different from the challenge text.

25. The at least one non-transitory computer readable storage medium of claim 24, wherein the other text is encoded in data stored in at least one channel of the plurality of channels, the at least one channel not including the transparency channel.

26. The at least one non-transitory computer-readable storage medium of claim 19, wherein the software code, when executed by the device, uses the decoding information to generate graphical elements based on the plurality of saturation values in the decoding information.

27. The at least one non-transitory computer-readable storage medium of claim 26, wherein the software code, when executed by the device, uses the decoding information to generate an HTML element for a pixel and set the color of the HTML element based on a saturation value for the pixel specified in the decoding information.

28. A device, comprising:
at least one hardware processor; and
at least one non-transitory computer readable storage medium storing processor-executable instructions that, when executed by the at least one hardware processor, cause the at least one hardware processor to perform:
transmitting, to at least one computer and via at least one network, a communication comprising a request to access a web resource;
receiving, from the at least one computer and via the at least one network, an image that encodes a challenge text and software code,
the image:
comprising pixel values in a plurality of channels including a transparency channel, and
storing decoding information for displaying the challenge text in the transparency channel, wherein the decoding information includes a plurality of saturation values for a respective plurality of pixels in the image;
the software configured to use the decoding information to facilitate displaying of the challenge text by the device;
executing the software code;
displaying, to a user of the device, the challenge text using decoding information in the transparency channel of the image;
receiving, from the user of the device, input specifying a response text; and
transmitting, to the at least one computer and via the at least one network, a communication comprising the response text.

29. The device of claim 28, wherein
the software code is configured to use the decoding information in the transparency channel of the image to cause a plurality of graphical elements to be displayed in a webpage so that the webpage displays the challenge text.

30. The device of claim 28, wherein the software code comprises JAVASCRIPT software code for execution by an Internet browser executing on the device, and wherein the displaying comprises executing the software code using the Internet browser.

* * * * *